(12) United States Patent
Green et al.

(10) Patent No.: US 11,536,825 B2
(45) Date of Patent: Dec. 27, 2022

(54) VEHICLE ODOMETRY AND MOTION DIRECTION DETERMINATION

(71) Applicant: THALES CANADA INC, Toronto (CA)

(72) Inventors: Alon Green, Toronto (CA); Marco De Thomasis, Toronto (CA)

(73) Assignee: THALES CANADA INC, Toronto (CA)

( * ) Notice: Subject to any disclaimer, the term of this patent is extended or adjusted under 35 U.S.C. 154(b) by 235 days.

(21) Appl. No.: 16/715,719

(22) Filed: Dec. 16, 2019

(65) Prior Publication Data

US 2020/0191938 A1 Jun. 18, 2020

Related U.S. Application Data

(60) Provisional application No. 62/779,949, filed on Dec. 14, 2018.

(51) Int. Cl.
*G01S 13/58* (2006.01)
*G01S 13/60* (2006.01)
(Continued)

(52) U.S. Cl.
CPC .......... *G01S 13/581* (2013.01); *B61L 25/026* (2013.01); *G01S 7/4004* (2013.01); *G01S 13/60* (2013.01); *G01S 13/62* (2013.01)

(58) Field of Classification Search
CPC ...... G01S 13/581; G01S 7/4004; G01S 13/60; G01S 13/62; G01S 7/40; G01S 13/58;
(Continued)

(56) References Cited

U.S. PATENT DOCUMENTS 4,863,123 A * 9/1989 Bernard ................ B61L 25/023
246/122 R
5,016,017 A 5/1991 Kodera et al.
(Continued)

FOREIGN PATENT DOCUMENTS

EP 2650696 B1 1/2015
WO 2015043974 A1 4/2015
(Continued)

OTHER PUBLICATIONS

D. M. Grimes and T. O. Jones, "Automotive radar: A brief review," in Proceedings of the IEEE, vol. 62, No. 6, pp. 804-822, Jun. 1974, doi: 10.1109/PROC.1974.9520. (Year: 1974).*

(Continued)

*Primary Examiner* — Bernarr E Gregory
*Assistant Examiner* — Yonghong Li
(74) *Attorney, Agent, or Firm* — Hauptman Ham, LLP

(57) ABSTRACT

The vehicle odometry and motion direction system and method is described. The vehicle odometry and motion direction system and method determines if the first ground speed data is acceptable. Ground speed data is calculated for all targets within a radar's field of view and targets ground speed data is processed to determine second ground speed data. The vehicle odometry and motion direction system and method determines trusted ground speed data using first ground speed data and second ground speed data and adjusts the trusted ground speed data due to errors in radar Doppler speed data.

20 Claims, 16 Drawing Sheets

(51) Int. Cl.
*G01S 13/62* (2006.01)
*G01S 7/40* (2006.01)
*B61L 25/02* (2006.01)

(58) Field of Classification Search
CPC ........ G01S 13/87; B61L 25/026; B61L 25/02; B61L 25/021; B61L 25/023; B61L 23/041
See application file for complete search history.

(56) References Cited

U.S. PATENT DOCUMENTS

| | | | |
|---|---|---|---|
| 9,043,131 | B2 | 5/2015 | Carlson et al. |
| 9,268,008 | B1 | 2/2016 | Abileah et al. |
| 9,562,778 | B2 | 2/2017 | DuHadway et al. |
| 9,610,961 | B2 | 4/2017 | Breuing |
| 9,817,399 | B2 | 11/2017 | Braunstein et al. |
| 9,903,945 | B2 | 2/2018 | Song et al. |
| 9,981,667 | B2 | 5/2018 | Hoare et al. |
| 10,042,040 | B2 | 8/2018 | Kobori et al. |
| 10,114,106 | B2 | 10/2018 | Schiffmann et al. |
| 2015/0005993 | A1* | 1/2015 | Breuing .................. G01S 13/60 701/19 |
| 2018/0232947 | A1* | 8/2018 | Nehmadi .............. G01S 17/931 |
| 2020/0142026 | A1* | 5/2020 | Bush ........................ G01S 13/89 |

FOREIGN PATENT DOCUMENTS

| | | |
|---|---|---|
| WO | 2018158712 A1 | 9/2018 |
| WO | 2019042523 A1 | 3/2019 |
| WO | 2019101774 A1 | 5/2019 |

OTHER PUBLICATIONS

Hassan Askari, E. Hashemi, A. Khajepour, M.B. Khamesee, Z.L. Wang, "Towards self-powered sensing using nanogenerators for automotive systems," Nano Energy, vol. 53, Nov. 2018, pp. 1003-1019, ISSN 2211-2855, https://doi.org/10.1016/j.nanoen.2018.09.032. (Year: 2018).*

Hilger, G., "Radartechnologie—Beriihrungsfreie Weg- und Geschwindigkeits- messung fur Schienenfahrzeuge", Ze Vrail—Glasers Annalen: Zeitschrift Fur Das Gesamte System Bahn, George Siemens Verlag GmBh & Co. KG, DE, vol. 122, No. 9/10, Sep. 1, 1998, p. 533.

Extended European Search Report issued in corresponding European Application No. 19894461.3, dated Aug. 9, 2022, pp. 1-9, European Patent Office, Munich, Germany.

* cited by examiner

| Doppler speed sign | Vehicle end | |
|---|---|---|
| | A | B |
| Positive | Reverse | Forward |
| Negative | Forward | Reverse |

Figure 6

| Parameter | Case I | Case II | Case III | Case IV | Case V |
|---|---|---|---|---|---|
| $X_1 = n_i / n$ | ≥0 & ≤1 | ≥0 & ≤1 | ≥0 & ≤1 | ≥0 & ≤1 | ≥0 & ≤1 |
| $X_2 = n_i \cdot ROI / n_i$ | =1 | =1 | =1 | ≤0.5 | >0.5 & <1 |
| $X_3 = n_i / m$ | =1 | <1 | <1 | >1 | >1 |
| $X_4 = n_i \cdot ROI / m$ | =1 | ≤0.5 | >0.5 & <1 | =1 | =1 |
| $X_5 = m / n$ | ≤1 | ≤1 | ≤1 | ≤1 | ≤1 |
| $X_6$ | =n | =n | =n | =n | =n |
| $X_7$ | =m | =m | =m | =m | =m |
| Description | Ideal perfect conditions, speed is trusted. All targets in the speed bin with the most number of targets successfully passed the ROI check (1). No other target outside of this bin successfully passed the ROI check (2). | Speed cannot be trusted. Same as (1). Most targets that successfully passed the ROI check are *not* in the speed bin with the most number of targets (3). | Speed is trusted. Same as (1). Most targets that successfully passed the ROI check are in the speed bin with the most number of targets (4). | Speed cannot be trusted. Most targets in the speed bin with the most number of targets did *not* pass the ROI check (5). Same as (2). | Speed is trusted. Most targets in the speed bin with the most number of targets successfully passed the ROI check (6). Same as (2). |

Figure 12

| Parameter | Case VI | Case VII | Case VIII | Case IX |
|---|---|---|---|---|
| $X_1 = n_i/n$ | $\geq 0$ & $\leq 1$ | $\geq 0$ & $\leq 1$ | $\geq 0$ & $\leq 1$ | $\geq 0$ & $\leq 1$ |
| $X_2 = n_i ROI / n_i$ | $\leq 0.5$ | $\leq 0.5$ | $> 0.5$ & $< 1$ | $> 0.5$ & $< 1$ |
| $X_3 = n_i/m$ | $\leq 1$ or $> 1$ | $> 1$ | $> 1$ | $\leq 1$ or $> 1$ |
| $X_4 = n_i ROI/m$ | $\leq 0.5$ | $\leq 0.5$ | $\leq 0.5$ | $\geq 0.5$ & $< 1$ |
| $X_5 = m/n$ | $\leq 1$ | $\leq 1$ | $\leq 1$ | $\leq 1$ |
| $X_6$ | $= n$ | $= n$ | $= n$ | $= n$ |
| $X_7$ | $= m$ | $= m$ | $= m$ | $= m$ |
| Description | Speed cannot be trusted. Same as (5). Same as (3). | Speed cannot be trusted. Same as (5). Same as (4). | Speed cannot be trusted. Same as (6). Same as (3). | Speed cannot be trusted. Same as (6). Same as (4). |

By definition.

Ideal perfect conditions. Ground speed calculated based on the radar can be trusted.

ROI is not properly defined, or moving objects within the radar's FOV, or ghost radar targets. Ground speed calculated based on the radar cannot be trusted.

Ground speed calculated based on the radar can be trusted.

Figure 13

| Minimum viable sesonrs set | Vehicle End Association | | | |
|---|---|---|---|---|
| | A | | B | |
| | Radar | "Diverse" sensor | Radar | "Diverse" sensor |
| 1 | ▨ | | | |
| 2 | | ▨ | | ▨ |
| 3 | ▨ | | | ▨ |
| 4 | | ▨ | ▨ | |

| ▨ | Minimum viable sensors set |
|---|---|

Figure 14

VEHICLE ODOMETRY AND MOTION DIRECTION DETERMINATION

RELATED APPLICATIONS

This application claims priority to U.S. Provisional Patent Application No. 62/779,949, titled "VEHICLE ODOMETRY AND MOTION DIRECTION DETERMINATION USING COTS RADAR" and filed on Dec. 14, 2018, which is incorporated herein by reference in its entirety.

BACKGROUND

Vehicle management includes determinations of vehicle odometry and motion direction. The need to manage vehicle odometry and motion direction is amplified in a mass-transit vehicle environ. Vehicle odometry includes the ground speed the vehicle is moving on the road or the rails and the distance the vehicle travelled along the road/rails since start up or with respect to a known landmark. Motion direction determinations inform vehicle management of which end of vehicle is leading and which direction the vehicle is moving.

BRIEF DESCRIPTION OF THE DRAWINGS

FIG. 6 is a table showing vehicle motion direction determinations, in accordance with some embodiments.

FIG. 12 is a table showing the result of nine cases, in accordance with some embodiments.

FIG. 13 is a table showing the result of nine cases, in accordance with some embodiments.

FIG. 14 is a table showing the minimum viable sensors set, in accordance with some embodiments.

DETAILED DESCRIPTION

Figure 1:
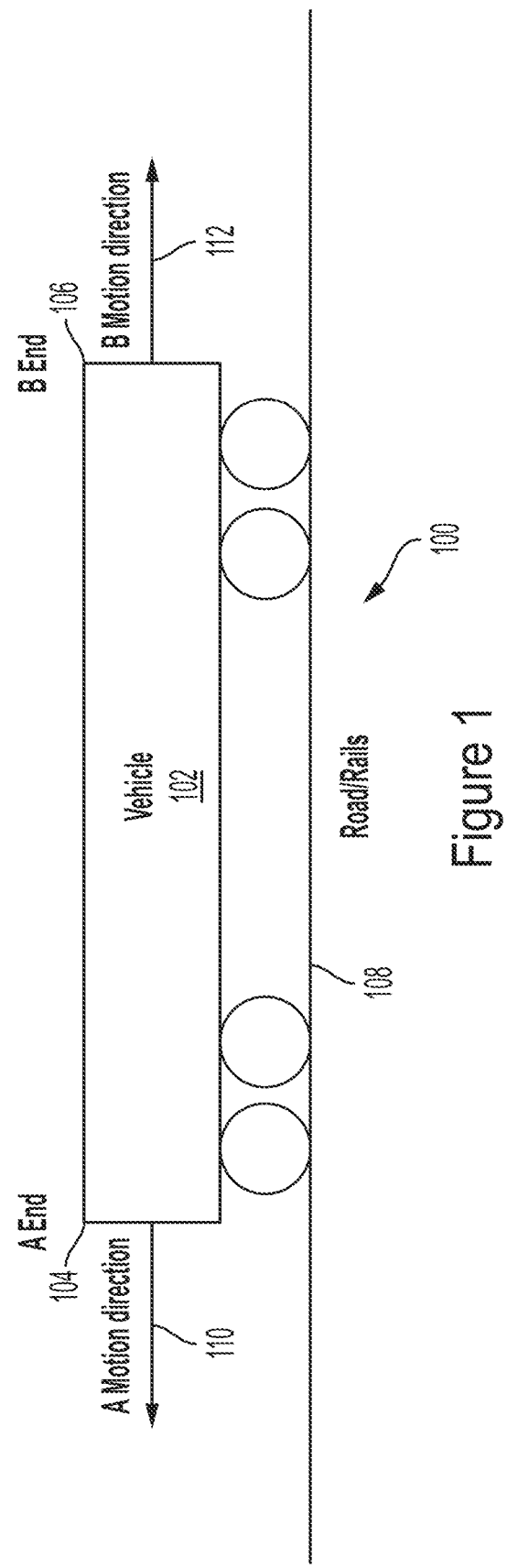
FIG. 1 is a simplified representation of "motion direction" in accordance with some embodiments.

The following disclosure provides many different embodiments, or examples, for implementing different features of the provided subject matter. Specific examples of components, values, operations, materials, arrangements, etc., are described below to simplify the present disclosure. These are, of course, merely examples and are not intended to be limiting. Other components, values, operations, materials, arrangements, etc., are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a simplified representation 100 of a vehicle on a track or road to demonstrate "motion direction". A vehicle 102 has a first end 104 (end A) and a second end 106 (end B). The vehicle 102 moves along a guideway 108. The guideway 108 is train tracks, in accordance with an embodiment, or other forms of guideway such as rails, concrete viaduct, monorails, or roads. The vehicle 102 moves in a first motion direction, motion direction A 110, or in a second motion direction, motion direction B 112. "Motion direction" is used to encompass a situation when end A 104 of the vehicle is leading, the "motion direction" of the vehicle is determined to be motion direction A 110. When end B 106 of the vehicle is leading, the "motion direction" of the vehicle is determined to be motion direction B 112.

Figure 2:
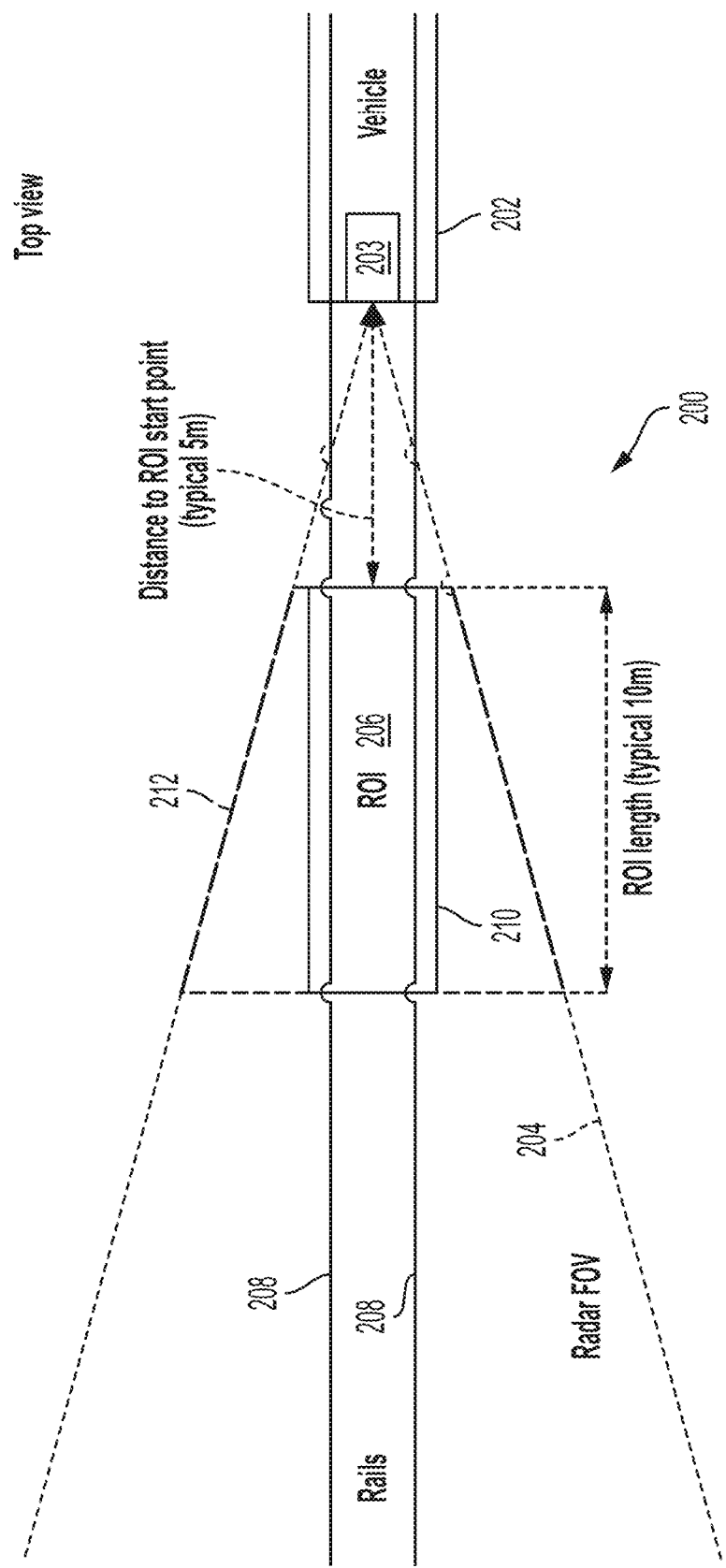
FIG. 2 is a top-view diagram of a vehicle odometry and motion direction system, in accordance with some embodiments.

FIG. 2 is a top-view diagram of a vehicle odometry and motion direction system 200, in accordance with an embodiment. A vehicle 202 includes a radar 203 having a radar field of view (FOV) 204. A region of interest (ROI) 206 is in front of an end of the vehicle 202, at a distance of about five meters. In some embodiments, the ROI 206 is farther or closer to the end of the vehicle 202. The ROI 206 has a length of about ten meters. In some embodiments, the ROI 206 has a length longer or shorter than ten meters. The vehicle 202 moves along rails 208. In some embodiments, the vehicle 202 moves along a predetermined path.

The vehicle odometry and motion direction system and method, in accordance with an embodiment, provides confirmation that the ground speed, initialized based on the radar 203, is correct and not influenced by moving objects within the radar FOV 204 or ghost objects "detected" by the radar 203.

The vehicle odometry and motion direction system and method, in accordance with an embodiment, provides confirmation that stationary objects within the defined ROI 206 are used to determine the ground speed and that the determined speed is not influenced by moving objects within the radar FOV 204 or ghost objects "detected" by the radar 203.

The ROI 206 is a rectangular-shaped area within the FOV 204, as depicted by the solid line 210, in accordance with an embodiment. The ROI 206 is a section of the FOV 204 with which the boundaries partially overlap with the ROI 206, as depicted by the dashed line 212, in accordance with an embodiment.

A ghost target is a real object having an incorrect reported (by the radar 203) position within the radar FOV 204 or is a non-existing object that is reported by the radar 203 as if it was a real object. Ghost targets result from multipath propagation of the electromagnetic waves, total reflection "through" walls, radial distance and speed ambiguity, multiple propagation, the existence of high radar cross-section object or objects outside of the FOV 204.

The ROI 206 is a construct from the distance to the ROI start point (e.g., 5 m) to the ROI length (e.g., 10 m). The ROI is a set of software defined parameters. The ROI 206 is contained within the radar's FOV 204, considering the minimum and maximum ranges of the FOV 204.

In accordance with an embodiment, the ROI start point and length is selected to avoid situations where the ROI start point starts too far away from the vehicle and the ROI length is too large resulting in the ROI 206 "spilling" into the neighboring tracks especially if the tracks 208 are curved. If the ROI start point is too close to the vehicle 202 or the ROI length is too short, the number of available targets that are accepted as valid targets for the odometry function is reduced.

Figure 3:
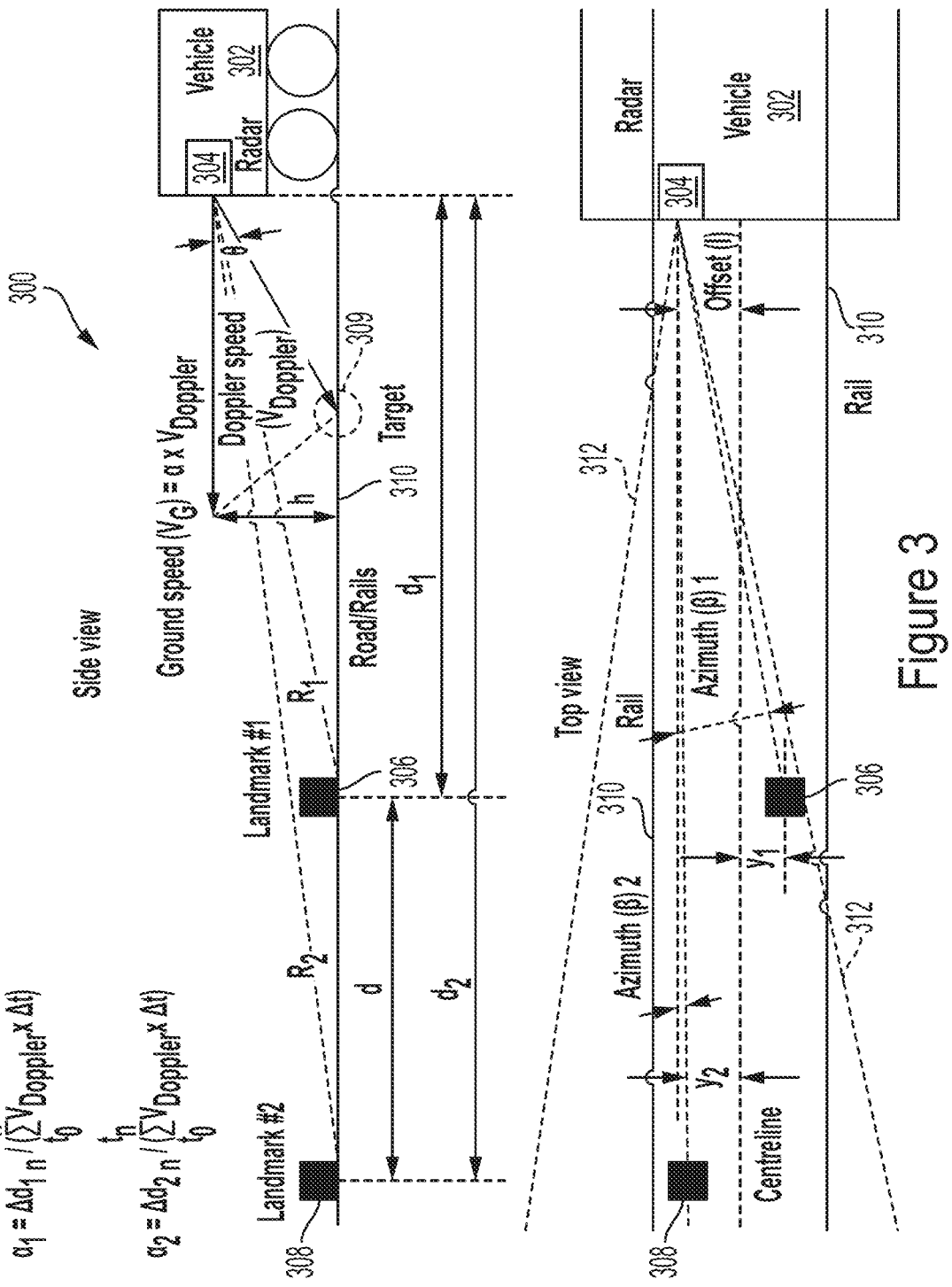
FIG. 3 is a top-view and side-view diagram of a vehicle odometry and motion direction system, in accordance with some embodiments.

FIG. 3 is a top-view and side-view diagram of a vehicle odometry and motion direction system 300, in accordance with an embodiment. A vehicle 302 with a radar 304 mounted at one end detects a first landmark 306, a second landmark 308 and a target 309 as the vehicle moves along a guideway 310.

The radar's Doppler speed transformation to ground speed by the vehicle odometry and motion direction system and method, in accordance with an embodiment, is verified based on comparing the calculated distance travelled, based on the radar's measurements, between two landmarks 306, 308 with known location ($\Sigma \alpha \times V_{Doppler} \times \Delta t$) to the distance between these two landmarks 306, 308 as stored in the database. $\alpha$ is the transformation function converting the Doppler speed ($V_{Doppler}$) measured by the radar to ground speed.

The radar 304 is installed on the "front" face of the vehicle 302 or at any other location on the vehicle 302 with good visibility towards the rails/road 310. The radar elevation above the track bed is h. The radar offset from the vehicle centreline is 1. The radar tilt angle is $\theta$.

The data received from a single radar on-board the vehicle is processed to generate the vehicle's ground speed and motion direction. The motion direction is determined based on the radar's Doppler speed sign and the radar association (in the vehicle database) with A end 104 or B end 106 of a vehicle.

For a radar installed "facing out" on A end 104 of the vehicle, the Doppler speed will be negative if the vehicle's speed direction is from B end 106 to A end 104 (forward direction), otherwise if the vehicle's speed direction is from A end 104 to B end 106 (reverse direction) the radar's Doppler speed will be positive.

For the radar installed "facing out" on B end 106 of the vehicle, the Doppler speed will be positive if the vehicle's speed direction is from B end 106 to A end 104 (forward direction), otherwise if the vehicle's speed direction is from A end 104 to B end 106 (reverse direction) the radar's Doppler speed will be positive.

The target or targets Doppler speed provided by the radar is converted into ground speed. This step is based on geometry transformation between the radar frame of reference and the vehicle's frame of reference as described in Thales U.S. patent application Ser. No. 15/247,142 which is hereby incorporated by reference.

FIG. 6 is a table showing vehicle motion direction determinations. When the Doppler speed sign is positive at vehicle end A, the motion direction is reverse. When the Doppler speed sign is positive at vehicle end B, the motion direction is forward. When the Doppler speed sign is negative at vehicle end A, the motion direction is forward. When the Doppler speed sign is negative at vehicle end B, the motion direction is reverse.

The relative speed between the radar 304 and the targets within the radar's FOV 312 is measured to non-moving stationary targets 309 residing on the "ground plane" which is the road or the track bed 310. The relative speed to targets within the radar's FOV 312 is the vehicle's ground speed component along the Line-of-Sight to these targets 309.

The calculated ground speed is accepted if it is based on target 309 that resides within a certain envelope (Region of Interest or ROI) determined by the minimum range, maximum range, the radar tilt angle $\theta$, minimum RCS etc., The maximum and minimum ranges are determined based on the radar's tilt angle $\theta$, the radar's elevation above the track bed h and the radar's vertical FOV.

At certain locations a pair of landmarks 306, 308 such as retroreflectors are installed with a known distance between the landmarks. The purpose of the landmarks pair 306, 308 is to calibrate the ground speed based on known ground truth distance. The landmarks 306, 308 are installed in such a way that the radar 304 will be able to detect both landmarks at the same time. The radar 304 measures the range to the first landmark 306 as R1 and to the second landmarks 30 as R2.

In the vehicle odometry and motion direction system and method, in accordance with an embodiment, a COTS radar 304 that is capable of providing the following measurements and their related attributes is used. The radar 304 determines the range to each target within the radar's Field-of-View (FOV) 312. The radar 304 determines the relative radial speed to each target within the radar's Field-of-View (FOV) 312. The radar 304 determines each target angular position within the radar's Field-of-View (FOV) 312. In accordance with an embodiment, the radar 304 determines the azimuth angle ($\beta$). In some more advanced radars, the radar determines the elevation angle (k). The radar 304 determines each target Radar Cross Section (RCS). The radar 304 determines the range measurement error (the standard deviation) for each target 310. The radar determines the relative radial speed measurement error (the standard deviation) for each target 310. The radar 304 determines the azimuth angle (and if applicable elevation angle too) measurement error (the standard deviation) for each target 310.

Target 310 is a reflective object that resides within the radar's FOV 312 and echoes the RF waves emitted by the radar 304. In accordance with an embodiment, the target 310 is a retroreflector that its echo propagates along the same line but opposite direction as the RF waves propagation from the radar 310. In accordance with an embodiment, the target 310 is a "diffused surface" type object with echoes propagating in any direction.

The COTS radar 304, in accordance with an embodiment, is a frequency modulated continuous wave radar, a standard radar in the automotive market, or other suitable types of radar.

Tthe calculated ground speed for all targets reported by the radar in every application cycle regardless if it passed the ROI check (or not) goes through statistical filtering process based on a histogram.

In each radar application cycle, at least n targets are reported. In accordance with an embodiment, n≥10.

Figure 4:
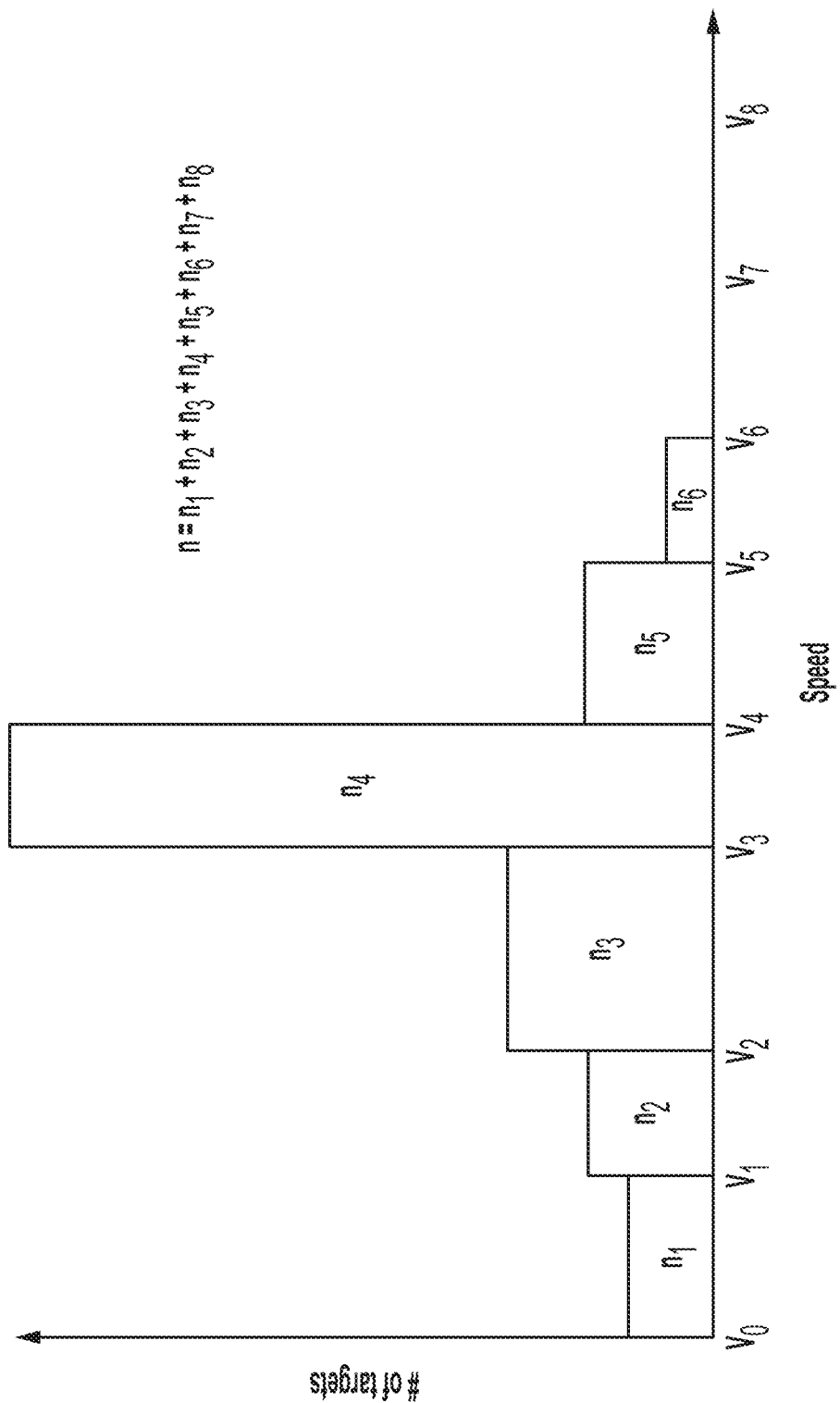
FIG. 4 is a histogram of the distribution of targets versus speed, in accordance with some embodiments.

FIG. 4 is a histogram of the distribution of targets versus speed, in accordance with an embodiment. The SPEED_BIN_SIZE parameter defines the speed range for each speed bin. This parameter is constant or varies for each speed bin. The value set for this parameter takes into account the thresholding criteria between multiple speed groups representing different objects within the radar's FOV. For example, objects on the track bed that are stationary and moving objects such as vehicle or vehicles moving on the neighboring tracks.

The ground speed candidates will be determined to the average speed of all targets within the bin with the most number of targets, the bin with the second most number of targets, and the bin with the third most number of targets.

The standard deviation of these speed candidates is determined. Then statistical tests will be applied to confirm that using t-test method or equivalent are the speeds calculated based on these bins independent or not, that using p-value method or equivalent are the speeds calculated based on these bins normally distributed or not.

The speed measured by the radar relative to an object or group of objects moving at the same speed (including stationary objects) is expected to be normally distributed. Speeds measured by the radar relative to objects moving at different speeds are expected to be independent variables while speeds measured by the radar relative to an object or group of objects moving at the same speed are expected to be dependent.

For each of these bins $X_1$ is determined to the ratio of the number of targets in the speed bin ($n_i$) to n (the number of reported targets). $X_1$ is a positive number between zero and 1. For each of these bins the speed standard deviation ($\sigma_i$) is expected to be within a certain predefined bounds to ensure the validity of the determined speed. In accordance with an embodiment, $\alpha_1$ is expected to be in the range from 0.01 m/sec to 0.05 m/sec.

Figure 5:
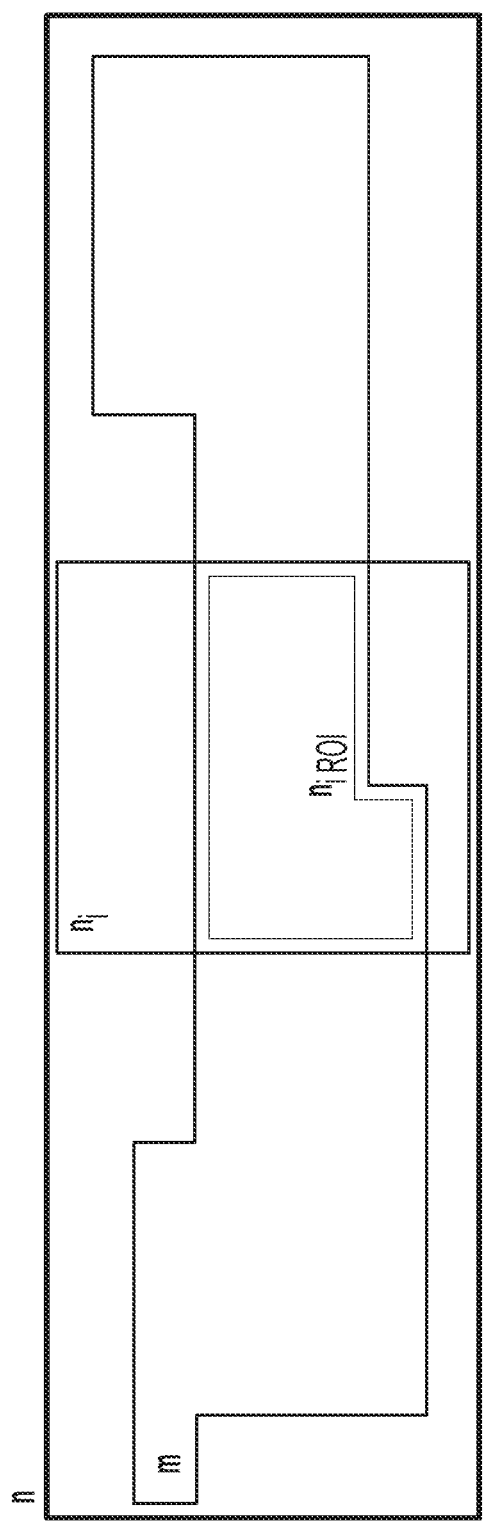
FIG. 5 is a diagram for determining ground speed, in accordance with an embodiment.

FIG. 5 is a diagram for determining ground speed, in accordance with an embodiment. The outcomes of accepting the calculated ground speed using an ROI check and the statistical filtering process determining the histogram bin with the three largest number of targets are processed to determine the ground speed. The whole and complete set of targets observed by the radar is n. The set of radar targets within the ROI is m; m forms a subset of n. The set of radar targets within speed bin i ($\Sigma n_i$=n) is $n_i$. The # of radar targets within speed bin i that are also within the ROI is $n_{i\ ROI}$ ($\Sigma n_{i\ ROI}$=m).

A check is performed to verify how many out of the speed measurements that are in each of these bins ($n_i$) satisfies the ROI check above ($n_{i\ ROI}$).

The ratio $X_2=n_{i\ ROI}/n_i$ is calculated.

The number of targets that successfully passed the ROI check is determined (m).

The ratio $X_3=n_i/m$ is calculated.

The ratio $X_4=n_i\ ROI/m$ is calculated.

The ratio $X_5=m/n$ is calculated.

The total number of targets is recalculated using $X_6=\Sigma_{i=1}^{i=n} ni$.

The number of targets within the ROI is recalculated using $X_7=\Sigma_{i=1}^{i=n} ni\ ROI$.

$X_6$ is expected to be equal to n and $X_7$ is expected to be equal to m.

FIGS. 12 and 13 are, taken together, a table showing the result of nine cases, in accordance with an embodiment.

The tables show the conditions, which when satisfied, indicate that the ground speed calculated based on the radar is trusted; and the conditions, which if satisfied, indicate that the ground speed calculated based on the radar is not trusted.

Figure 7:
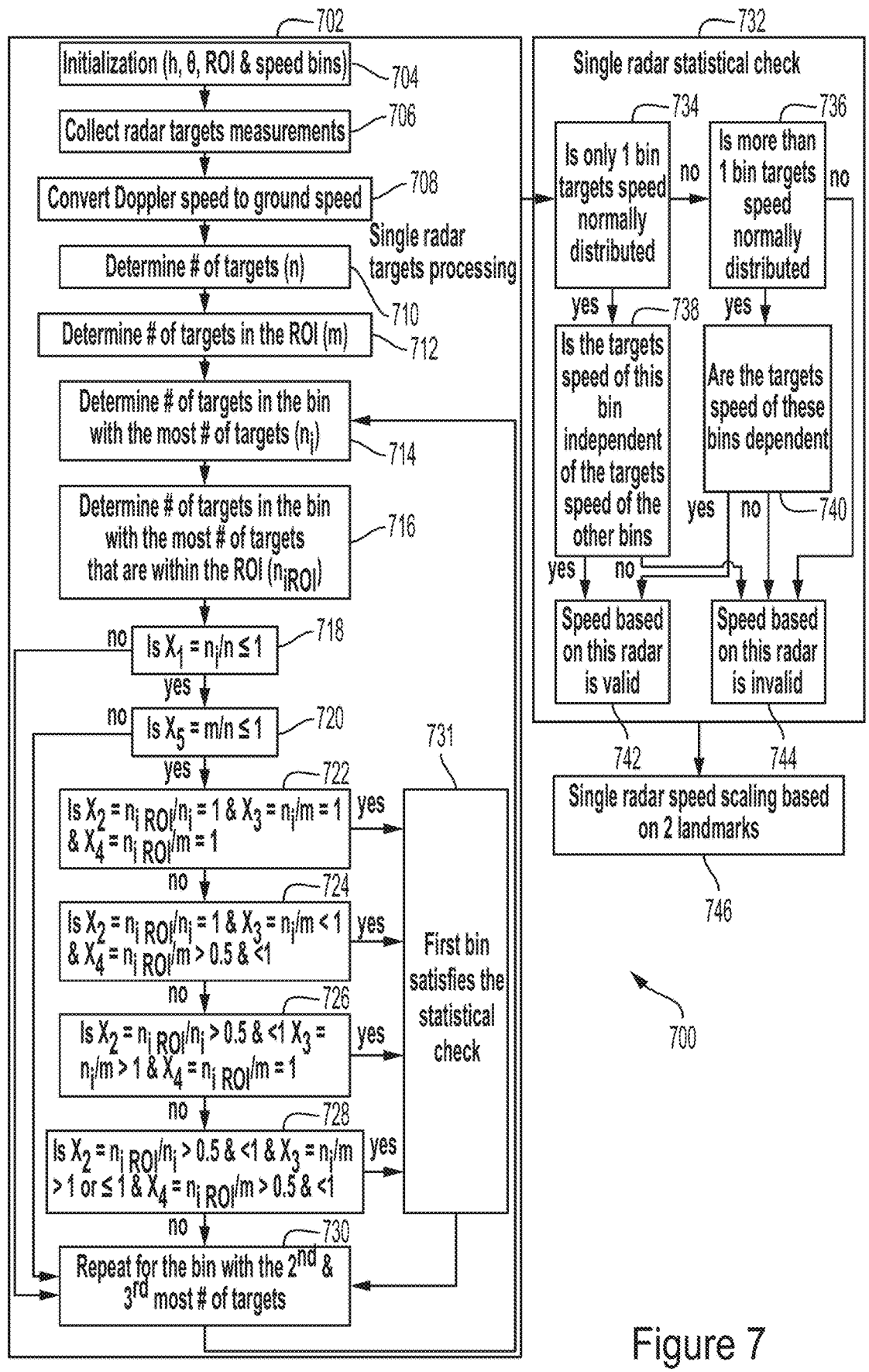
FIG. 7 is a flowchart of a method of speed determination, in accordance with some embodiments.

FIG. 7 is a flowchart of a method of speed determination 700, in accordance with an embodiment. A single radar target processing step 702 proceeds to a single radar statistical check 732 resulting in a single radar speed scaling based on two landmarks 746. The single radar target processing step includes an initialization step 704. Radar target measurements are collected in step 706. The Doppler speed is converted to ground speed data in step 708. The number of targets n is determined in step 710. The number of targets m within the ROI is determined in step 712. Then the number of targets $n_i$ in the bin with the greatest number of targets is determined in step 714. The number of targets ($n_{i\ ROI}$) in the bin with the greatest number of targets that are within the ROI is determined in step 716. The method, in step 718, then checks to see if the ratio of the number of targets in the bin with the greatest number of targets in the ROI to the total number of targets is less than or equal to one. (Is $X_1=n_i/n<=1$?)

If $X_1$ is less than or equal to one, then the method, in step 720, determines if the ratio of the number of targets in the ROI to the total number of targets is less than or equal to one. (Is $X_5=m/n<=1$?)

If either $X_1$ or $X_5$ is not less than or equal to 1, then the process is repeated for the bin with the $2^{nd}$ and $3^{rd}$ greatest number of targets in step 730.

If both X1 and X5 are less than or equal to 1, the method, in step 722, determines if the ratio of the number of targets ($n_{i\ ROI}$) in the bin with the most number of targets that are within the ROI to the number of targets ($n_i$) in the bin with the most number of targets is equal to one and if the ratio of the number of targets ($n_i$) in the bin with the most number of targets to the number of targets in the ROI (m) is equal to one and if the ratio of the number of targets ($n_i$) in the bin with the most number of targets to the number of targets in the ROI (m) is equal to one. (Is $X_2=n_{i\ ROI}/n_i=1$ & $X_3=n_i/m=1$ and $X_4=n_{i\ ROI}/m=1$?). If so, the first bin satisfies the statistical check in step 731. The process is then repeated for the bin with the second and third greatest number of targets in step 730.

If the equalities in step 722 fail, the method, in step 724 determines if the ratio of the number of targets ($n_{i\ ROI}$) in the bin with the most number of targets that are within the ROI to the number of targets ($n_i$) in the bin with the most number of targets is equal to one and if the ratio of the number of targets ($n_i$) in the bin with the most number of targets to the number of targets in the ROI (m) is less than one and if the ratio of the number of targets ($n_i$) in the bin with the most number of targets to the number of targets in the ROI (m) is greater than 0.5 and less than one. (Is $X_2=n_{i\ ROI}/n_1=1$ & $X_3=n_i/m<1$ and $X_4=n_{i\ ROI}/m>0.5$ and <1?). If so, the first bin satisfies the statistical check in step 731.

If the equalities in step 724 fail, the method, in step 726 determines if the ratio of the number of targets ($n_{i\ ROI}$) in the bin with the most number of targets that are within the ROI to the number of targets ($n_i$) in the bin with the most number of targets is greater than 0.5 & less than one and if the ratio of the number of targets ($n_i$) in the bin with the most number of targets to the number of targets in the ROI (m) is greater than one and if the ratio of the number of targets ($n_i$) in the bin with the most number of targets to the number of targets in the ROI (m) is equal to one. (Is $X_2=n_{i\ ROI}/n_i>0.5$ & $<1$ & $X_3=n_i/m>1$ and $X_4=n_{i\ ROI}/m=1$?). If so, the first bin satisfies the statistical check in step 731.

If the equalities in step 726 fail, the method, in step 728 determines if the ratio of the number of targets (ni ROI) in the bin with the most number of targets that are within the ROI to the number of targets ($n_i$) in the bin with the most number of targets is greater than 0.5 & less than one and if the ratio of the number of targets (ni) in the bin with the most number of targets to the number of targets in the ROI (m) is greater than one or less than or equal to one and if the ratio of the number of targets ($n_i$) in the bin with the most number of targets to the number of targets in the ROI (m) is greater than 0.5 and less than one. (Is $X_2=n_{i\ ROI}/>0.5$ & $<1$ & $X_3=n_i/m>1$ or $</1$ and $X_4=n_{i\ ROI}/m>0.5$ & $<1$?). If so, the first bin satisfies the statistical check in step 731. When the single radar targets processing in step 702 is completed, the method proceeds to the single radar statistical check in step 732. In step 734, the method determines if one bin targets speed is normally distributed.

If one bin targets speed is normally distributed in step 734, the method, in step 738, determines if the targets speed of the bin is independent of the targets speed of the other bins. If the targets speed of the bin is not independent of the targets speed of the other bins in step 738, the speed based on this radar, such as radar 304 in FIG. 3, is invalid in step 744. If the targets speed of the bin is independent of the targets speed of the other bin in step 738, the speed based on this radar is valid in step 742.

If one bin targets speed is not normally distributed in step 734, the method, in step 736, determines if more than one bin targets speed is normally distributed. If more than one bin targets speed is not normally distributed in step 736, the speed based on the radar is invalid in step 744. If more than one targets speed is normally distributed in step 736, the method, in step 740, determines if the targets speed of these bins are dependent. If the targets speed of the bins are not dependent in step 740, the speed based on this radar is invalid in step 744. If the targets speed of these bins are dependent, the speed based on this radar is valid. The results are then used to determine single radar speed scaling based on two landmarks is performed in step 746.

Using the t-test method or equivalent and the p-value method or equivalent as described in steps 718-731, applied to the bins, the bin or bins that are the best representation of the ground speed is determined.

For example, the bin or bins that has normally distributed speed and its speed matches the speed determined based on the ROI check.

In some cases, determining which bin is the best representation of the ground speed is difficult. For example, if all speed bins described above, or at least two of them, have normally distributed speed and the speed calculated based on each bin is independent from each other, then the outcome is inconclusive and additional information is needed to resolve the situation.

The ground speed requires further scaling adjustment due to errors in the conversion from the Doppler speed to the ground speed.

At certain locations a pair of landmarks such as retroreflectors are installed with a known distance between the 2 landmarks. The purpose of the landmarks pair is to calibrate the ground speed based on known ground truth distance.

The 2 landmarks will be installed in such a way that the radar will be able to detect both landmarks at the same time. The radar, such as radar 304 in FIG. 3, measures the range to both landmarks ($R_1$ & $R_2$ in Diagram 4). The distance to each landmark is determines as in Equations 1 and 2.

$$d_1=(R_{12}-h_2)^{1/2} \quad \text{Equation (1)}$$

$$d_2=(R_{22}-h_2)^{1/2} \quad \text{Equation (2)}$$

The system will check that the difference between $d_1$ and $d_2$ matches d (the distance between the two landmarks) within a specified tolerance as shown in the Equation below.

$$\text{Absolute}(\text{Absolute}(d_1-d_2)-d)<d_{Checking\ Tolerance} \quad \text{Equation (3)}$$

$d_{Checking\ Tolerance}$ is determined based on the landmarks installation tolerance (Landmark$_{Installation\ Error}$), the radar range measurement error (Radar$_{Range\ Error}$), the radar height above track bed installation error ($h_{Error}$) plus some predefined margin ($\Delta d_{Margin}$) as shown in Equation 4.

$$d_{Checking\ Tolerance}=\text{Landmark}_{Installation\ Error}+(\text{Radar}_{Range\ Error}^2+h_{Error}^2)^{1/2}+\Delta d_{Margin} \quad \text{Equation (4)}$$

If the check according to Equation (3) above is passed the transformation from the Doppler speed measured by the radar ($V_{Doppler}$) to the vehicle Ground speed (VG) is scaled according to Equations 5, 6, 7 and 8.

$$\alpha_1=\Delta d_{1\ n}/\Sigma_{t0}^{tn}(V1\ \text{Doppler}/\cos(\sin-1(h/R1)))\times\Delta t \quad \text{Equation (5)}$$

$$\alpha_2=\Delta d_{2\ n}/\Sigma_{t0}^{tn}(V2\ \text{Doppler}/\cos(\sin-1(h/R2)))\times\Delta t \quad \text{Equation (6)}$$

$$\Delta d_{1\ n}=\text{Absolute}(d_{1\ m}-d_{1\ t0}) \quad \text{Equation (7)}$$

$$\Delta d_{2\ n}=\text{Absolute}(d_{2\ m}-d_{2\ t0}) \quad \text{Equation (8)}$$

$di_{1\ m}$ is the distance to landmark 1 calculated based on the radar range measurement at time $t_n$.

$d_{1\ t0}$ is the distance to landmark 1 calculated based on the radar range measurement at time $t_0$.

$d_{2\ m}$ is the distance to landmark 2 calculated based on the radar range measurement at time $t_n$.

$d_2$ to is the distance to landmark 2 calculated based on the radar range measurement at time $t_0$.

The scaling factor ($\alpha$) is determined to be the average between $\alpha_1$ and $\alpha_2$.

To verify the integrity of the above calculations at any point in time the absolute value of the difference between $d_1$ and $d_2$ ($d_1-d_2$) matches the criteria defined in Equation (3) above as shown in Equation 9.

$$\text{Absolute}(\text{Absolute}(d_{1\ t_n}-d_{2\ m})-d)<d_{Checking\ Tolerance} \quad \text{Equation (9)}$$

The absolute value of difference between $\Delta d_1$ and $\Delta d_2$ ($\Delta d_1-\Delta d_2$) satisfies Equation 10.

$$\text{Absolute}(\Delta d_{1\ n}\Delta d_{2\ n})=\text{Absolute}((d_{1\ tn}-d_{1\ m-1})-(d_{2\ m}-d_{2\ m-1}))<d_{Checking\ Tolerance} \quad \text{Equation (10)}$$

Figure 8:
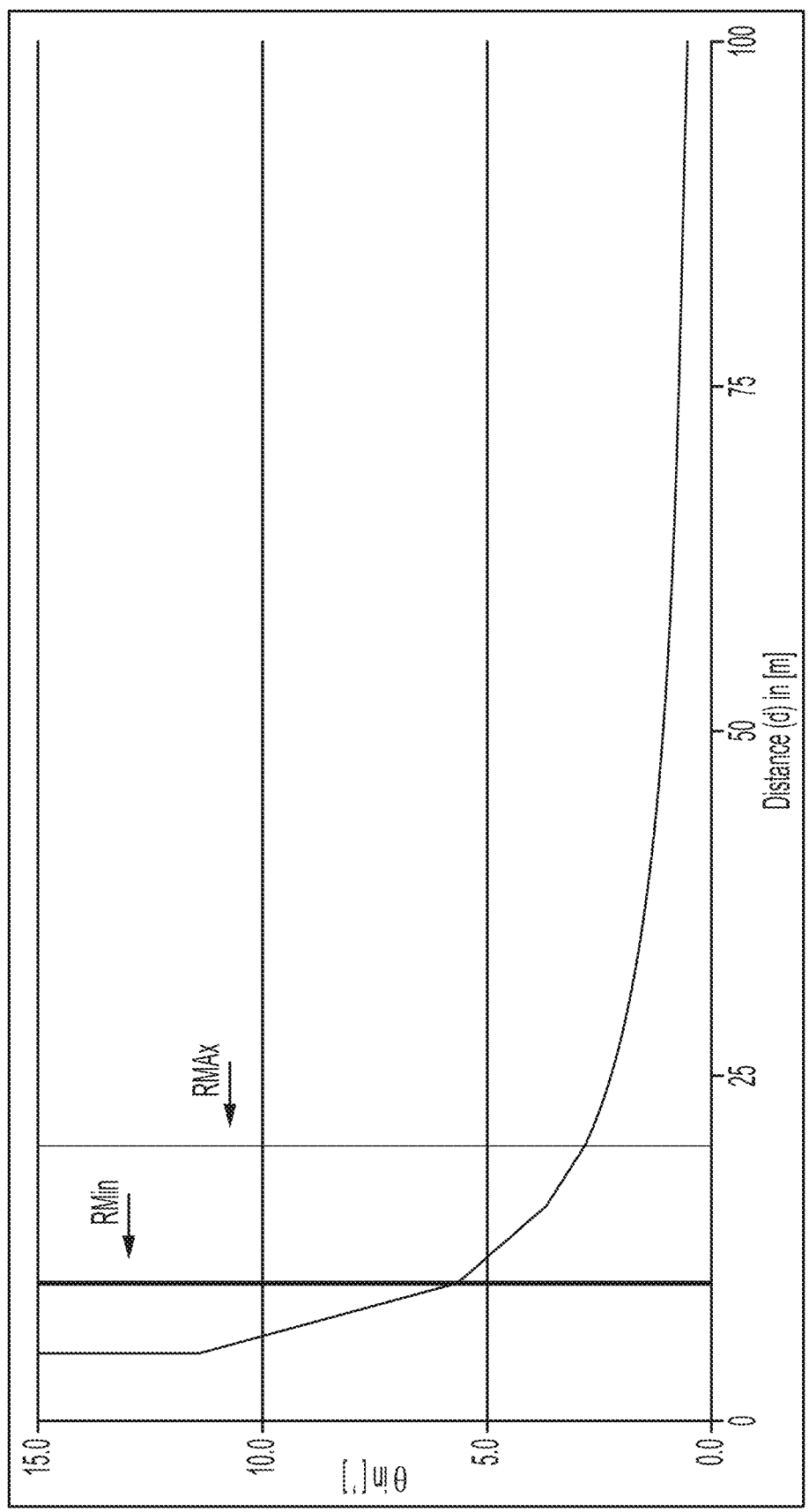
FIG. 8 is a graph of the calibration scaling factor, in accordance with some embodiments.

FIG. 8 is a graph of the calibration scaling factor. The calibration scaling factor a is a function of the target vertical orientation within the radar's FOV ($\theta=\sin-1(h/R)$). To reduce the influence of $\theta$ on $\alpha$t radar targets are accepted, in the context of the odometry function, when the range satisfies Equation 1.

$$R_{Min}<R<R_{Max}\ \text{or alternatively}\ d_{Min}<d<d_{Max} \quad \text{Equation (11)}$$

For example, $R_{Min}=10$ m and $R_{Max}=20$ m.

The target inclination angle, with respect to the local horizon, is approximately the ratio of the radar elevation above the ground plane (h) and the range to the target (R). In the context of the pair of calibration landmarks, the method in accordance with one or more embodiments of this invention suggests to track these pair of landmarks if the range to the landmark is greater than the minimum and less than the maximum. When the vehicle approaches the pair of landmarks, the landmarks will be tracked if they are within the range window.

The greater the range thresholds, α will be less sensitive to θ. However, the likelihood of the speed determined based on the radar being influenced by moving objects within the radar's FOV is greater too. The selection of $R_{Min}$ and $R_{Max}$ balances between these two factors; the sensitivity of α to θ and the likelihood that the radar target is a moving target.

The landmarks are installed in certain stopping locations such as in platforms where the vehicle is intended to stop to off-load passengers and to board new passengers. In this case, the process described above is performed while the vehicle is stationary (not moving) to confirm that the vehicle is aligned with the platform.

During the time period from to $t_n$ both landmarks are observed by the radar.

Single radar system are not able to determine the correct vehicle speed when the radar measures the relative speed to multiple objects which are moving at different speeds. To resolve this situation, the ground speed calculated based on the single radar is checked against the speed determined based on another diverse sensor which uses different and independent measurement technology to determine the ground speed and the speed determined based on other radar on-board the vehicle, if available.

In accordance with various embodiments, the diverse sensor that uses another diverse and independent measurement technology to determine the ground speed is a body mounted IMU with 3-D accelerometer and 3-D gyroscope, a wheel/axle mounted accelerometer array (single axis or multi axis), an optical tachometer, a Hall effect speed sensor, a LiDAR, a Visible/IR spectrum camera or any other suitable sensor.

The vehicle odometry and motion direction system and method, in accordance with an embodiment, reduces the probability of incorrect ground speed determined based on single radar measurements due to environmental conditions, "Ghost" targets or moving objects within the radar's FOV to an acceptable level. In some embodiments, an acceptable level is below a predetermined threshold level.

The vehicle odometry and motion direction system and method, in accordance with an embodiment, provides calibration of single radar measurements against pair of landmarks with known distance between the two (2) landmarks.

The vehicle odometry and motion direction system and method, in accordance with an embodiment, provides high safety integrity level (SIL level 4) ground speed determination function with "non-simple" sensors such as, but not limited to, radar and another diverse sensor based on different and independent measurement technology without "deep" analysis of the sensors internal failure modes (FMEA).

The two sensors (i.e. COTS radar and diverse sensor") are based on completely different non-overlapping sensing technologies.

The probability of these two sensors being influenced by environment or any common cause failure related to environment of or random failure is negligible to improbable.

The speed calculation method based on the COTS radar measurements and the speed calculation method based on the diverse sensor measurements are completely different mathematically and based on completely different algorithms.

"In agreement" indicates that the speed calculated based on the COTS radar measurements and the speed calculated based on the diverse sensor measurements match within a predefined tolerance. On top of the two sensors being completely different and non-overlapping including their associated algorithms the safety bag argument allows the speed determined based on one of the sensors (either the COTS radar or the diverse sensor) to be more accurate than the other sensor while the other sensor (either the diverse sensor or the COTS radar) being less accurate but "encapsulating" the other sensor within a certain envelope. In this way the ground speed determined by the proposed method is trusted with high confidence level satisfying the integrity level requirement.

For an over-speed protection device) to be rated as Safety Integrity Level (SIL) 4, the over-speed protection device is required to have demonstratable on-demand reliability. SIL 4 is based on International Electrotechnical Commission's (IEC) standard IEC 61508. SIL 4 requires the probability of failure per hour to range from 10-8 to 10-9.

For railway applications, an acceptable level of incorrect ground speed determined by the SIL 4 system is from $10^{-8}$ to $10^{-9}$ per operating hour. In accordance with an embodiment, the minimum viable sensor set for determining the ground speed is two (2) sensors which use diverse and independent measurement technologies. The product of the 2 sensor errors satisfies the Equation 12.

$$P_{Incorrect\ Speed} = P_{Incorrect\ Speed\ Radar} \times P_{Incorrect\ Speed\ Diverse\ Sensor} \quad \text{Equation (12)}$$

In the vehicle odometry and motion direction system and method, in accordance with an embodiment, as long as the COTS radar and the diverse sensor measurement technologies are non-overlapping and the algorithms used to calculate the speed based on the COTS radar and the diverse sensor are completely different, failure to meet the acceptable level of incorrect ground speed, of the COTS radar alone or the diverse sensor alone, does not prevent the system as a whole from meeting acceptable levels.

"Non-simple" sensors are a complex sensor which usually has a processor and/or its measurements are based on LOS measurement principle and/or its detailed failure modes are not known.

The sensor safety concept shifts from the "checked-redundant" concept, which relies on cross comparison between two identical sensors, to a "diversity and self-checking" concept which relies on two independent, different and based on different sensing technologies sensors, in accordance with an embodiment.

Figure 9:
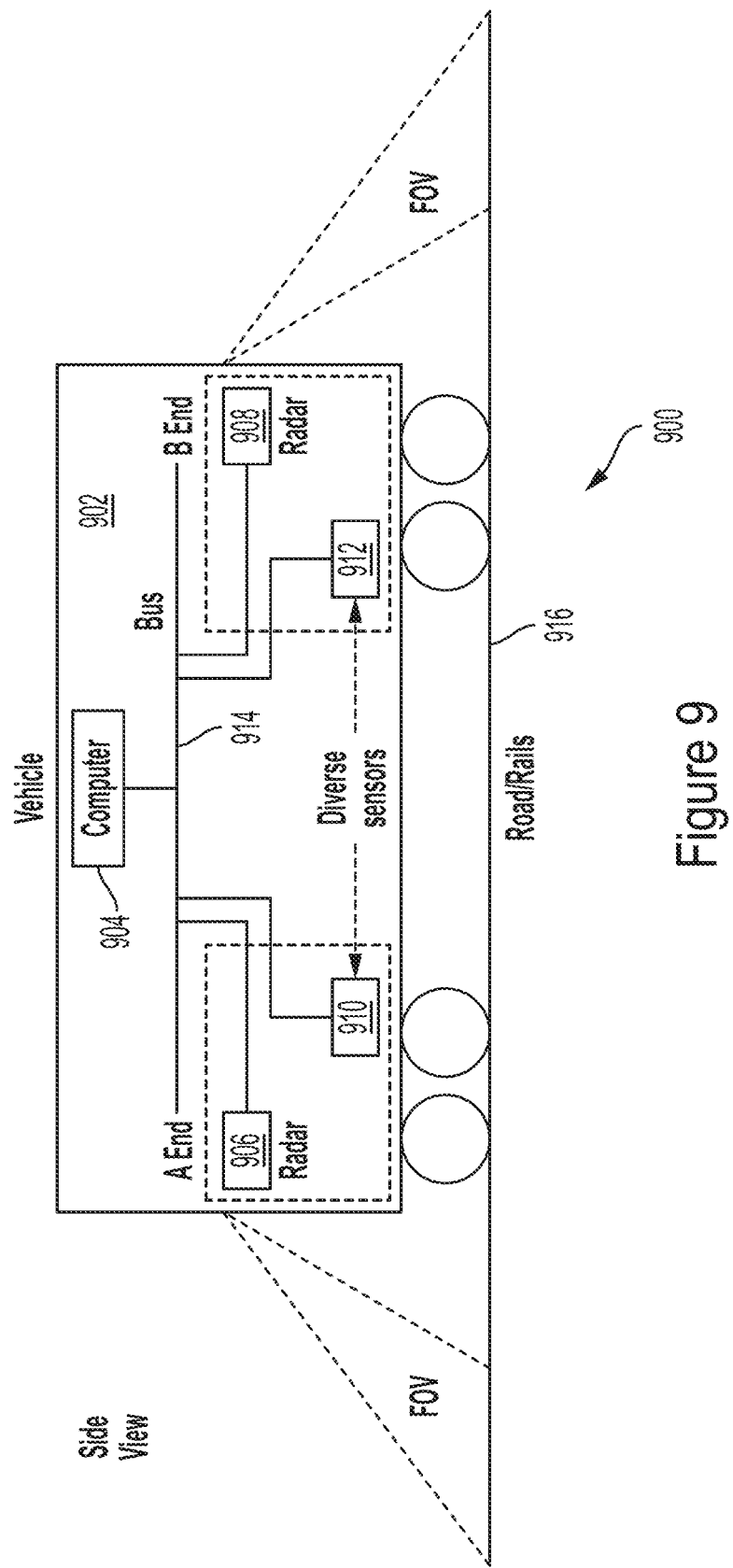
FIG. 9 is the system architecture of a vehicle odometry and motion direction system in the context of a rail vehicle, in accordance with some embodiments.

FIG. 9 is a diagram of the system architecture of a vehicle odometry and motion direction system 900 in the context of a rail vehicle, in accordance with an embodiment. A rail vehicle 902 includes a computer 904, a communication bus 914, an A end radar 906, a B end radar 908, a first diverse sensor 910 and a second diverse sensor 912 and travels on guideway 916.

Vehicle 902 is the smallest train consist unit. A train consist consists of a single vehicle 902 or multiple vehicles coupled together. Each end of each vehicle 902 is equipped with a single "facing out" radar 906, and a single diverse sensor 910.

In accordance with an embodiment, the diverse sensor 910 includes measurement technology different and independent from the radar. In accordance with an embodiment, the diverse sensor 910 is capable of providing a "motion direction" determination. In accordance with an embodiment, the diverse sensor is capable of providing ground speed. In accordance with an embodiment, the diverse sensor is capable of providing dead reckoning distance travelled. The diverse sensor is not influenced by adverse weather conditions or, if it is influenced by adverse weather conditions, the impact of such conditions on its measurements are completely non-overlapping with the influence of such conditions on the radar measurements. The diverse sensor is not influenced by moving objects at the vehicle's surrounding or, if it is influenced by moving objects in the vehicles surrounding, the impact of such conditions on its measurements are completely non-overlapping with the influence of such conditions on the radar measurements.

Figure 15:
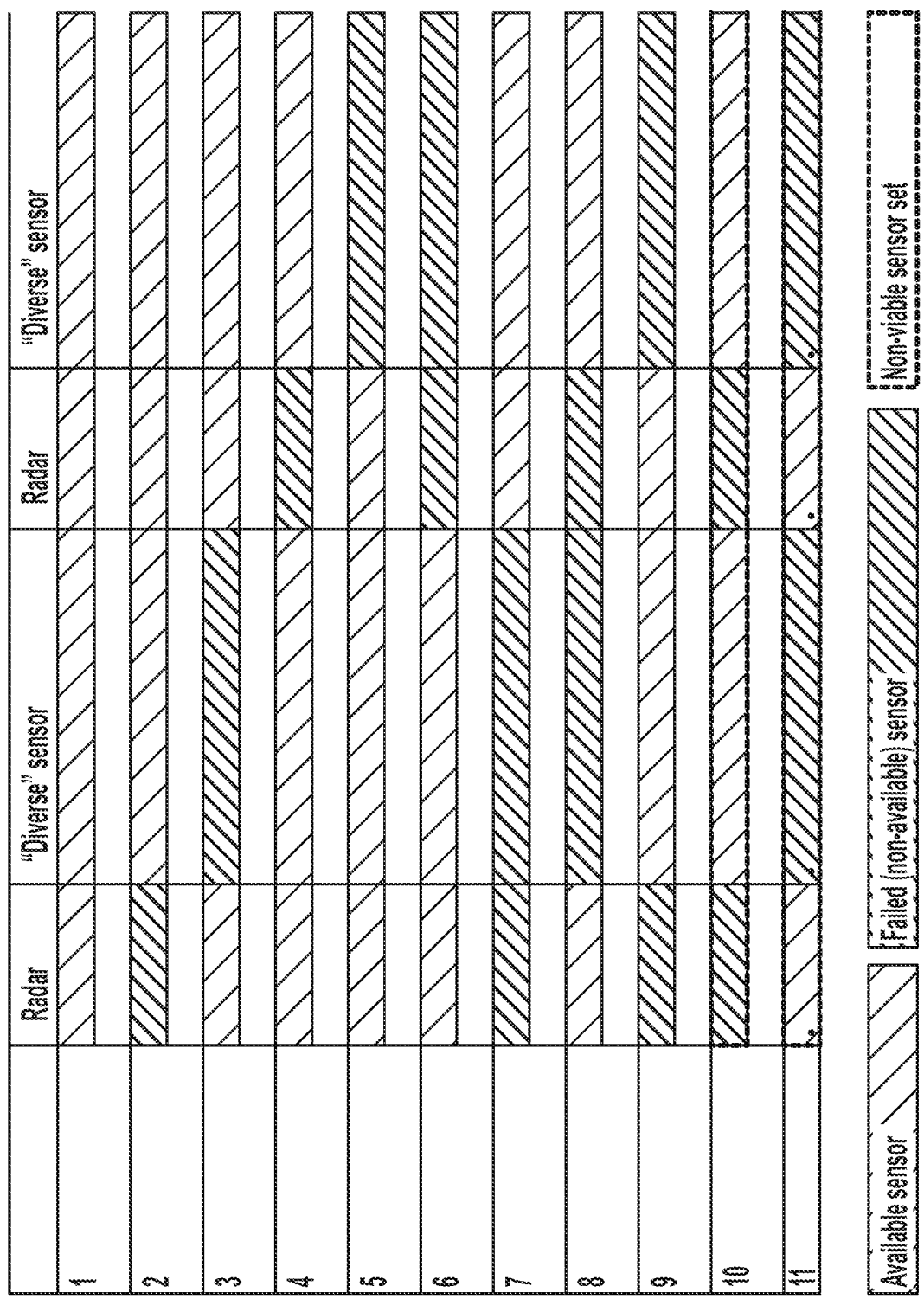
FIG. 15 is a table depicting the viable sensors, in accordance with some embodiments.

FIG. 15 is a table showing the minimum viable sensor set. The minimum viable sensor set is single radar 906 and single diverse sensor 910. The two sensors 910, 912 are associated with the same end of the vehicle 902, or one sensor 910 associated with a particular end of the vehicle 902 and the other sensor 912 associated with the other end of the vehicle 902.

Figure 16:
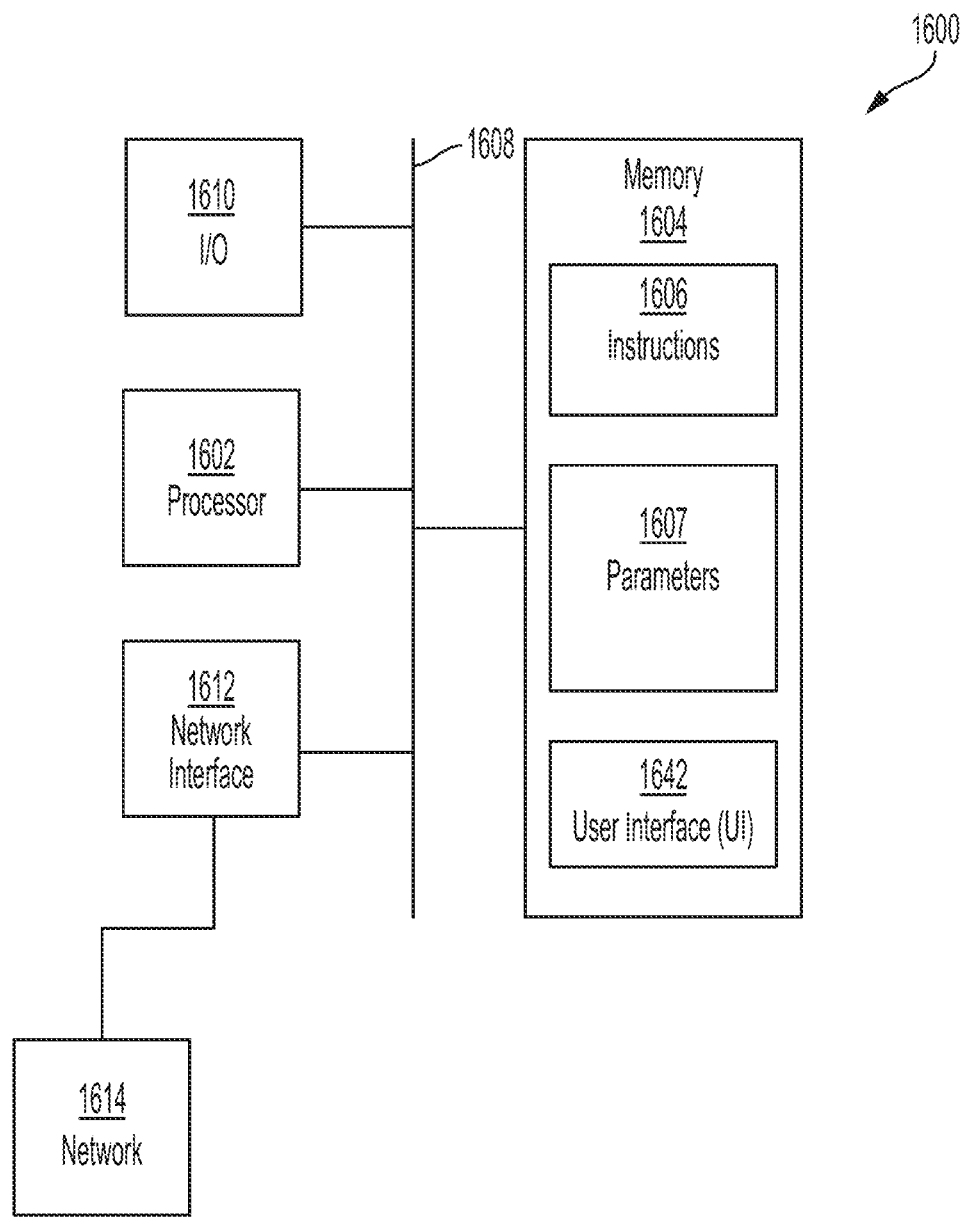
FIG. 16 is a high-level block diagram of a processor-based system usable in conjunction with one or more embodiments.

FIG. 16 is a table depicting the viable sensors, in accordance with an embodiment. The system operates while all sensors in the vehicle are available, or while single sensor failure occurs, or while certain combination of double failure occurs as long as the minimum viable sensors set is maintained. If both radars have failed, or both diverse sensors failed, the system is not operational because the minimum viable sensor set is not maintained.

Figure 10:
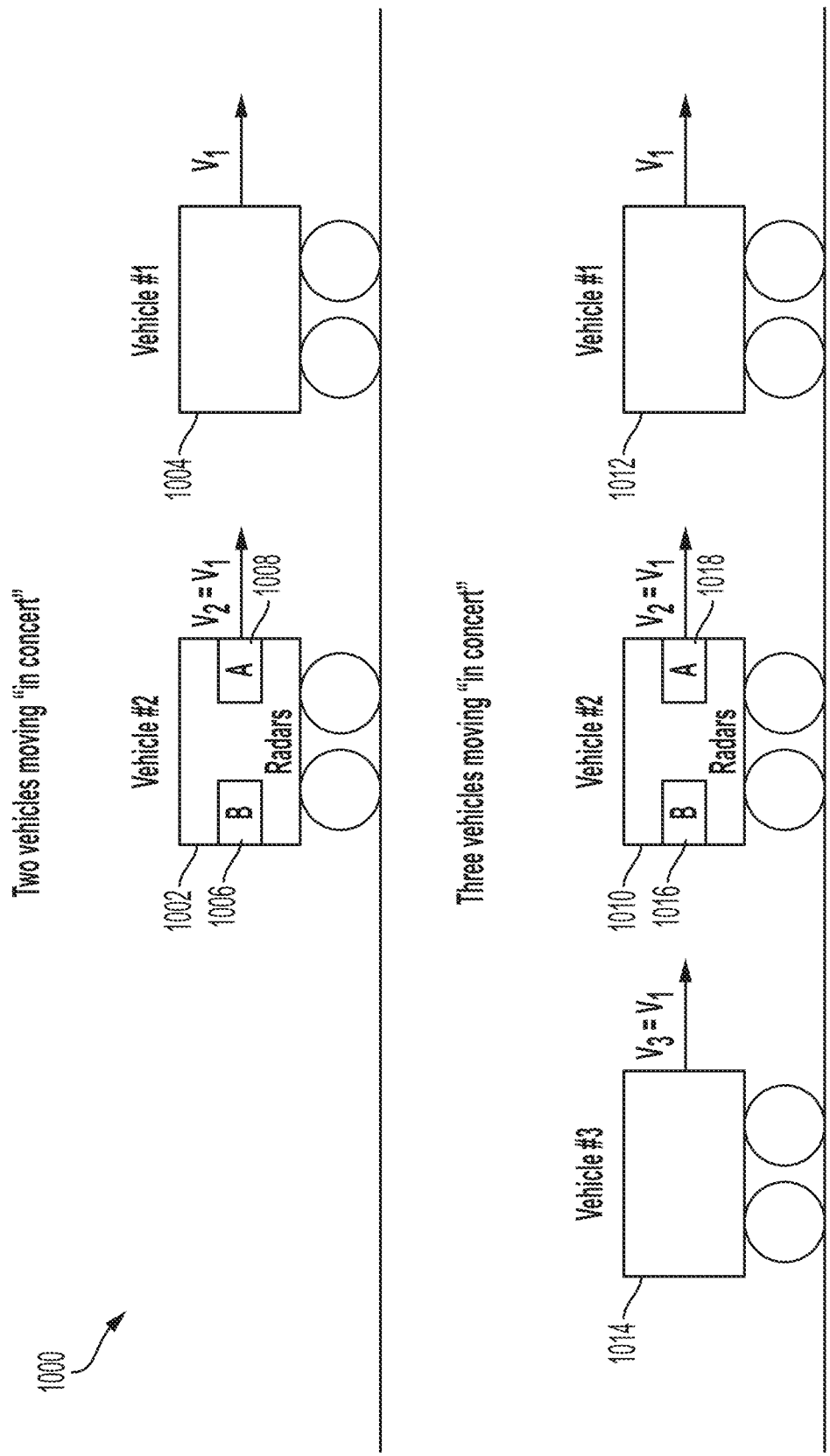
FIG. 10 is a diagram depicting two scenarios of vehicles moving "in concert", in accordance with some embodiments.

FIG. 10 is a diagram depicting two scenarios of vehicles moving "in concert" 1000, in accordance with an embodiment. In the first scenario, two vehicles 1002 and 1004 are moving "in concert". In the second scenario, three vehicles 1010, 1012 and 1014 are moving "in concert". "In concert" here means the same speed and the same motion direction. Vehicle 1002 has two radars, one radar 1008 at end A and another radar 1006 at end B. Vehicle 1010 has two radars, one radar 1018 at end A and another radar 1016 at end B.

In the first scenario and with both radars and both diverse sensors installed on vehicle 162 1002 properly functioning, radar A 1008 of vehicle's 162 1002 will measure Doppler speed of zero (0) while radar B 1006 of vehicle 162 1002 will measure Doppler speed of +V2. The speed determined based on radar A 1008 will not agree with the speed determined based on radar B 1006. The speed determined based on diverse sensor A will agree with the speed determined based on diverse sensor B because these sensors do not measure relative speed. The speed will be determined based on the two diverse sensors which will also match the speed determined by radar B.

In the first scenario, when one of the radars installed on vehicle 162 1002 fails (either radar A 1008 or radar B 1006), the speed determined based on diverse sensor A will agree with the speed determined based on diverse sensor B because these sensors do not measure relative speed which may or may not match the speed determined by the non-failed radar.

In the first scenario and when of the diverse sensors installed on vehicle 162 1010 fails (either A or B), the speed determined based on the non-failed diverse sensor will match the speed determined based on radar B 1006.

For the first scenario, the speed is correctly determined therefore having high safety integrity level as expected from the odometry function.

In the second scenario and with both radars and both diverse sensors installed on vehicle 162 1010 properly functioning, both radar A 1018 and radar B 1016 of vehicle's 162 1010 will measure Doppler speed of zero (0). The speed determined based on radar A 1018 will match the speed determined based on radar B 1016 but will be incorrect because the vehicle 1010 is moving but the speed determined based on both radars will indicate that the vehicle 1010 is not moving. The speed determined based on diverse sensor A will agree with the speed determined based on diverse sensor B and will represent the speed the vehicle 1010 is moving at because these sensors do not measure relative speed. The speed will be determined based on the two diverse sensors.

In the second scenario, when one of the radars installed on vehicle 162 1010 fails (either radar A 1018 or radar B 1016), the speed determined based on diverse sensor A will agree with the speed determined based on diverse sensor B because these sensors do not measure relative speed.

In the second scenario, when one of the diverse sensors installed on vehicle 162 1010 fails (either A or B), the non-failed diverse sensor provides the correct vehicle speed and the therefore the speed is not determined with high integrity. The likelihood of such scenario is improbable because three independent vehicles 1010, 1012, 1014 have to move "in concert" with relatively short separation distance between the vehicles (e.g. less than 30 m).

Figure 11:
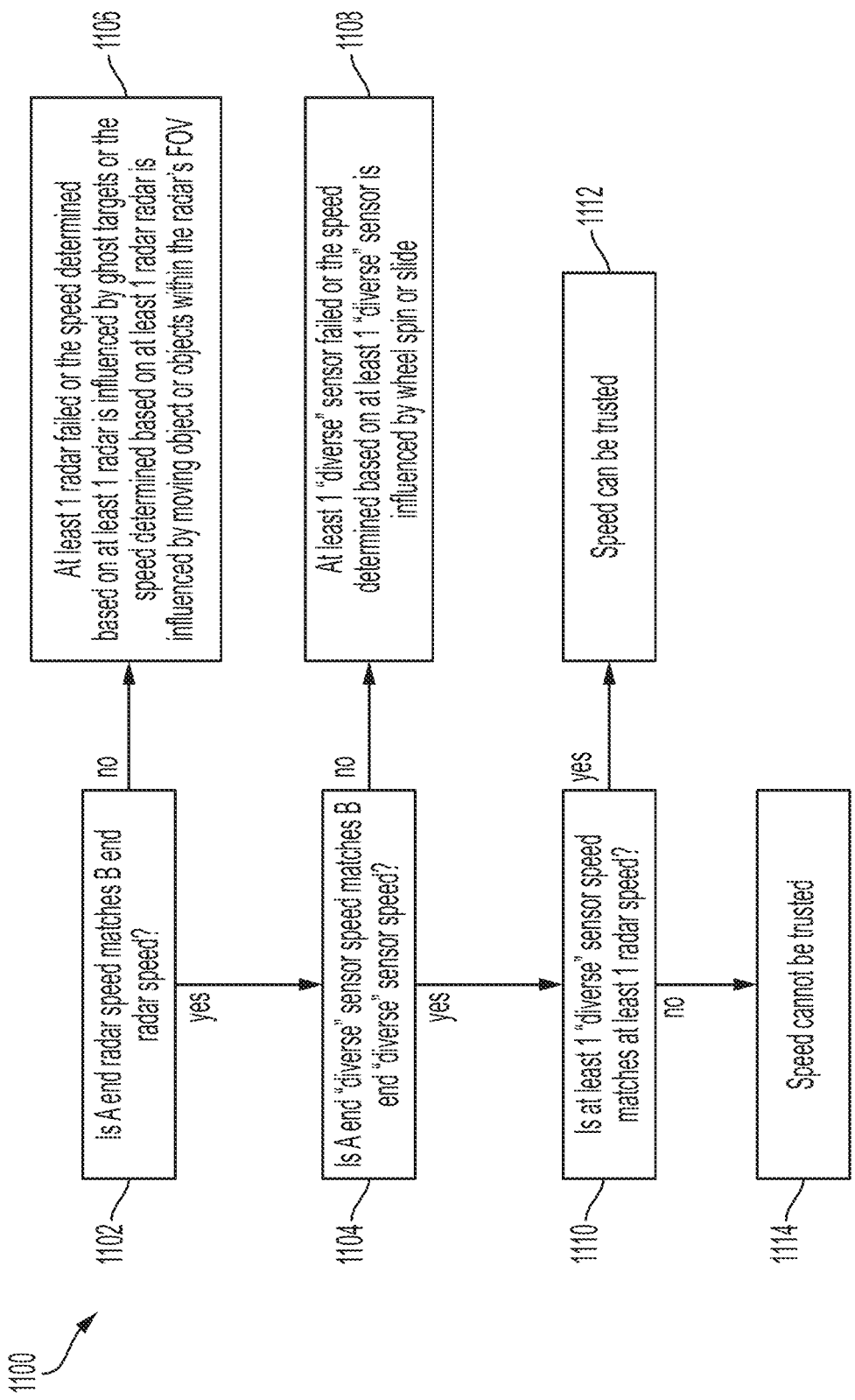
FIG. 11 is a flowchart for a method with multiple sensors, in accordance with some embodiments.

FIG. 11 is a flowchart for a method with multiple sensors 1100, in accordance with an embodiment. First, the method determines if the A end radar speed matches the B end radar speed in step 1102. If the radar speeds match in step 1102, the method determines if the A end diverse sensor speed matches the B end diverse sensor speed in step 1104.

If the A end diverse sensor speed matches the B end diverse sensor speed in step 1104, the method determines if at least one of the diverse sensor speeds matches at least one of the radar speeds in step 1110. If there is a match in step 1110, the speed is trusted in step 1112. If there is not a match in step 1110, the speed is not trusted in step 1114.

If the A end radar speed does not match the B end radar speed in step 1102, at least one radar has failed or the speed determined, based on at least one radar, such as radar 304 in FIG. 3, is influenced by ghost targets or the speed determined based on at least one radar, such as radar 304 in FIG. 3, is influenced by moving objects within the radar's FOV in step 1106.

If the A end diverse sensor speed does not match the B end diverse sensor speed in step 1104, at least one diverse sensors has failed or the speed determined based on at least one diverse sensor is influenced by wheel spin or slide, in step 1108.

In case the diverse sensor, such as diverse sensor 910 in FIG. 9, is a tachometer or speed sensor the wheel diameter used in transforming the counted pulses into speed and distance travelled is calibrated using the same method as used for the radar calibration.

$$r_{Wheel} = N \times \frac{1}{2}(\Delta d_{1\,n} + \Delta d_{2\,n})/2\pi \qquad \text{Equation (4)}$$

$r_{Wheel}$ is the wheel radii.

N is the number of tachometer/speed sensor pulses per single (1) wheel revolution.

$\Delta d_{1\,n}$ and $\Delta d_{2\,n}$ are defined in Equations (7) and (8) above.

Both safety (SIL 4) and availability targets are satisfied with less than or equal to equipment than in the existing systems.

With all sensors available the sensors of the same type (e.g. radars and diverse sensors) are checked against each other to detect random hardware failures. i.e. cross compare between the two radars and cross compare between the two diverse sensors.

With all single sensor failure and some double sensor failures, and as long as the minimum viable sensors set is maintained and the odometry and motion direction determination function is maintained.

A minimum viable sensor set, in accordance with an embodiment, includes two sensors: Radar (or LiDAR or visible/IR spectrum camera) and a diverse sensor, such as diverse sensor 910 in FIG. 9, using different and independent from the radar measurement technology.

Safety case for high integrity level (i.e. 4) odometry and motion direction determination functions that does not rely on understanding the sensors detailed failure modes.

This system and method provide a safety case for high integrity level (i.e. 4) odometry and motion direction determination functions that do not update upon sensor or sensor change as long as the conditions listed above are respected.

The ground speed is calculated based on single radar measurements and calibrated against known distance between two (2) landmarks offsetting bias in the radar measurements.

A higher confidence level in the ground speed calculated based on the radar measurements if the following properties are maintained:

$X_1 \le 1$.
$X_2 > 0.5$ & $X_2 \le 1$.
$X_3$ NA.
$X_4 > 0.5$ & $X_4 \le 1$.
$X_5 \le 1$.

The vehicle odometry and motion direction system and method, in accordance with an embodiment, provides a method to filter the targets reported by COTS radar, such as radar 304 in FIG. 3, based on Region of Interest (ROI) and speed bins to increase the probability of the vehicle's ground speed determined based on the relative speed reported by the radar, such as radar 304 in FIG. 3, accurately represents the vehicle's ground truth speed and therefore less influenced by ghost targets and moving objects within the radar's Field of View (FOV).

The vehicle odometry and motion direction system and method, in accordance with an embodiment, provides a method to calibrate (scale) the vehicle's ground speed determined based on the Doppler speed reported by the radar, such as radar 304 in FIG. 3, with two retroreflective landmarks which are separated by a predefined distance known to the system.

The vehicle odometry and motion direction system and method, in accordance with an embodiment, provides a method to check the correctness of the radar's measurements by comparing the radar's measurements and the speed determined based on the radar's measurements against a known ground truth landmarks.

The vehicle odometry and motion direction system and method, in accordance with an embodiment, provides a method to construct a minimum viable sensors set to deliver the odometry and motion direction functions with high integrity level (SIL 4) using single COTS radar, such as radar 304 in FIG. 3, and diverse sensor, such as diverse sensor 910 in FIG. 9, which provides measurement technology different and independent than the radar, such as radar 304 in FIG. 3, provides motion direction, provides ground speed, provides dead reckoning distance travelled, is not influenced by adverse weather conditions or if it is influenced by adverse weather conditions the impact of such conditions on its measurements are completely non-overlapping with the influence of such conditions on the radar measurements, is not influenced by moving objects at the vehicle's surrounding or if it is influenced by moving objects in the vehicles surrounding the impact of such conditions on its measurements are completely non-overlapping with the influence of such conditions on the radar measurements.

The vehicle odometry and motion direction system and method, in accordance with an embodiment, provides a mathematical method and algorithm to determine the speed is completely different and non-overlapping with respect to the mathematical method and algorithm used to determine the speed based on the COTS radar, such as radar 304 in FIG. 3.

The vehicle odometry and motion direction system and method, in accordance with an embodiment, provides a method to construct minimum viable sensors set to deliver the odometry and motion direction functions with high integrity level (SIL 4) using single COTS radar, such as radar 304 in FIG. 3, and diverse sensor, such as diverse sensor 910 in FIG. 9, without the need to understand the sensors failure modes creating a generic safety case which is independent of the radar type or vendor and diverse sensor type or vendor.

The vehicle odometry and motion direction system and method, in accordance with an embodiment, provides verification that the measurement technologies of the COTS radar, such as radar 304 in FIG. 3, and the diverse sensor, such as diverse sensor 910 in FIG. 9, are completely different and non-overlapping.

The vehicle odometry and motion direction system and method, in accordance with an embodiment, provides verification that the speed calculation algorithms based on the COTS radar, such as radar 304 in FIG. 3, and the diverse sensor, such as diverse sensor 910 in FIG. 9, are completely different.

The vehicle odometry and motion direction system and method, in accordance with an embodiment, provides the speed error model of the COTS radar, such as radar 304 in FIG. 3, and the diverse sensor, such as diverse sensor 910 in FIG. 9, satisfy the system needs.

The vehicle odometry and motion direction system and method, in accordance with an embodiment, provides a method to determine the wheel diameter in the case of the "diverse' sensor used is a speed sensor and/or tachometer.

The vehicle odometry and motion direction system and method, in accordance with an embodiment, provides a method to determine the vehicle speed, motion direction and alignment (with external to the vehicle object such as platform) with high integrity level (SIL 4) using a COTS radar, such as radar 304 in FIG. 3, landmarks installed at dedicated locations and diverse sensor, such as diverse sensor 910 in FIG. 9, which provides measurement technology different and independent than the radar, such as radar 304 in FIG. 3, provides motion direction, provides ground speed, provides dead reckoning distance travelled, is not influenced by adverse weather conditions or if it is influenced by adverse weather conditions the impact of such conditions on its measurements are completely non-overlapping with the influence of such conditions on the radar measurements, is not influenced by moving objects at the vehicle's surrounding or if it is influenced by moving objects in the vehicles surrounding the impact of such conditions on its measurements are completely non-overlapping with the influence of such conditions on the radar measurements.

The vehicle odometry and motion direction system and method, in accordance with an embodiment, provides a mathematical method and algorithm to determine the speed is completely different and non-overlapping with respect to the mathematical method and algorithm used to determine the speed based on the COTS radar, such as radar 304 in FIG. 3.

The vehicle odometry and motion direction system and method, in accordance with an embodiment, provides a method to reliably determine the vehicle's speed based on COTS radar, such as radar 304 in FIG. 3, and landmarks installed at dedicated locations relying on ROI defined on the track bed/road, real-time speed distribution assessment of the ground speed calculated based on the Doppler speed measured by the radar, such as radar 304 in FIG. 3, verification of the range (to two landmarks separated by a known distance) measured by the radar, such as radar 304 in FIG. 3, against the known distance between these two landmarks, verification of the range rate (to two landmarks separated by a known distance) calculated based on the radar range measurement against the ground speed calculated based on the Doppler speed measured by the radar, such as radar 304 in FIG. 3, verification that the ground speed calculated based on the speed bin with the highest confidence level (determined based on the real-time speed distribution assessment) corresponds to the ground speed calculated based on the ROI.

The vehicle odometry and motion direction system and method, in accordance with an embodiment, provides a method to claim high integrity (SIL 4) odometry and motion direction functions based on COTS radar, such as radar 304 in FIG. 3, landmarks installed at dedicated locations and diverse sensor, such as diverse sensor 910 in FIG. 9, without the need for apriori knowledge of the radar, such as radar 304 in FIG. 3, and diverse sensor failure modes in condition that the diverse sensor, such as diverse sensor 910 in FIG. 9, provides measurement technology different and independent than the radar, such as radar 304 in FIG. 3, provides motion direction, provides ground speed, provides dead reckoning distance travelled, is not influenced by adverse weather conditions or if it is influenced by adverse weather conditions the impact of such conditions on its measurements are completely non-overlapping with the influence of such conditions on the radar measurements, is not influenced by moving objects at the vehicle's surrounding or if it is influenced by moving objects in the vehicles surrounding the impact of such conditions on its measurements are completely non-overlapping with the influence of such conditions on the radar measurements.

The vehicle odometry and motion direction system and method, in accordance with an embodiment, provides a mathematical method and algorithm to determine the speed is completely different and non-overlapping with respect to the mathematical method and algorithm used to determine the speed based on the COTS radar, such as radar 304 in FIG. 3.

The vehicle odometry and motion direction system and method, in accordance with an embodiment, provides a method to improve the availability of the system using the odometry and motion direction functions without increasing the equipment cost (number of sensors) with respect to the existing systems baseline.

The vehicle odometry and motion direction system and method, in accordance with an embodiment, uses a COTS radar, such as radar 304 in FIG. 3, and landmarks installed at dedicated locations to determine the vehicle's ground speed.

The vehicle odometry and motion direction system and method, in accordance with an embodiment, provides verification of the range (to two landmarks separated by a known distance) measured by the radar, such as radar 304 in FIG. 3, against the known distance between these two landmarks.

The vehicle odometry and motion direction system and method, in accordance with an embodiment, provides verification of the range rate (to two landmarks separated by a known distance) calculated based on the radar range measurement against the ground speed calculated based on the Doppler speed measured by the radar, such as radar 304 in FIG. 3.

The vehicle odometry and motion direction system and method, in accordance with an embodiment, provides verification that the speed bin with the highest confidence level determined by the Real-time speed distribution assessment is sufficiently associated with targets within the ROI.

The alignment between the vehicle and an external object (such as platform) while the vehicle is stationary (no motion) is determined with high integrity (SIL 4).

The vehicle odometry and motion direction system and method, in accordance with an embodiment, provides verification of the range (to two landmarks separated by a known distance) measured by the radar, such as radar 304 in FIG. 3, against the known distance between these two landmarks.

The vehicle odometry and motion direction system and method, in accordance with an embodiment, provides verification that the range measured by the radar, such as radar 304 in FIG. 3, to each landmark corresponds within predefined tolerance (in accordance with an embodiment, 5 cm to 10 cm) to the range from the radar, such as radar 304 in FIG. 3, to this landmark while the vehicle is aligned with the external object (such as platform).

Under no sensor failure (all sensors perform as expected) the traditional "checked redundant" safety principle which cross compare the outputs of two sensors of the same type is used to detect random failure associated with sensor or sensors of the same type.

Under single sensor failure, or in some cases multiple sensors failure, as long as at least single radar, such as radar 304 in FIG. 3, and single diverse sensor, such as diverse sensor 910 in FIG. 9, are healthy the "diversity and self-checking" safety principle which ensures that the speed determined based on these two sensors measurements matches (within predefined tolerance) is used, for a limited duration of time (in accordance with an embodiment, a few hours until the train goes out of service and the failed sensors are replaced) to ensure the integrity of the odometry and motion direction functions The vehicle odometry and motion direction system and method, in accordance with an embodiment, uses COTS radar, such as radar 304 in FIG. 3, landmarks installed at dedicated locations and diverse sensor, such as diverse sensor 910 in FIG. 9, to achieve high availability (better than the availability achieved with existing systems) and high integrity level (SIL 4) odometry and motion direction determination functions without the need for a priori knowledge of the radar, such as radar 304 in FIG. 3, and diverse sensor failure modes.

The vehicle odometry and motion direction system and method, in accordance with an embodiment, provides a method to determine the vehicle's ground speed using COTS radar, such as radar 304 in FIG. 3, ROI and speed bins filtering.

The vehicle odometry and motion direction system and method, in accordance with an embodiment, provides a method to validate the performance of a COTS radar, such as radar 304 in FIG. 3, using landmarks installed at dedicated locations.

The vehicle odometry and motion direction system and method, in accordance with an embodiment, provides a method to verify the alignment of the vehicle (while stopped) with external object (such as platform) using a COTS radar, such as radar 304 in FIG. 3, and landmarks installed at dedicated locations associated with the stopping location of the vehicle at the platform.

Implementation uses the radar height above the track bed (h) and radar inclination angle ($\theta$). These two parameters influence the ROI. The higher the h and the smaller the $\theta$ the radar, such as radar 304 in FIG. 3, detects targets further away from the vehicle. The larger the $\theta$ the larger the scale factor in the conversion from the radar's Doppler speed to the vehicle ground speed. In accordance with an embodiment, h will be from 1 m to 2.5 m and $\theta$ from 0° to 10°.

The size of the ROI ($R_{Min}/R_{Max}$ or $d_{Max}/d_{Min}$).

If the ROI is too small the odometry function availability is adversely impacted (not enough targets). If the ROI is too large the radar's targets are influenced by moving objects. In accordance with an embodiment, dMin id from 3 m to 5 m and dMax is from 15 m to 25 m.

The number of speed bins (16_OF_SPEED_BINS) and the size (speed band) of the speed bins (SPEED_BIN_SIZE).

If not enough speed bins are allocated multiple objects both stationary and moving are allocated to the same speed bin. If too many speed bins are allocated speed associated with a single object are "spilled" into multiple speed bins. Similarly for the speed bins size, if the size (Band) of the speed bins is too wide multiple objects both stationary and moving are allocated to the same speed bin, or if the size (band) of the speed bins is too narrow speed associated with a single object are "spilled" into multiple speed bins. In accordance with an embodiment, the size (band) of the speed bins has to be at least ±6σ ensuring speed measured to a single target will be allocated to a single speed bin and the number of the speed bins is determined based on the maximum speed range and the size of the speed bins (e.g. VMax/SPEED_BIN_SIZE).

Implementation uses the distance between the two landmarks (d). The distance between the two landmarks has to be long enough to allow the radar, such as radar 304 in FIG. 3, to discriminate between the two landmarks, in accordance with an embodiment, greater than or equal to 2 m. It also has to be not too long to allow the radar, such as radar 304 in FIG. 3, to detect the two landmarks simultaneously, in accordance with an embodiment, less than or equal to 15 m.

One radar is installed on the A end of the vehicle while the other radar is installed on the B end of the vehicle to avoid common cause influence of moving objects or ghost targets on both radars simultaneously.

A key property in the selection of the diverse sensor, such as diverse sensor 910 in FIG. 9, is to ensure its measurement technology is non-LOS principle. i.e. not a radar, LiDAR and visible/IR spectrum camera. Preferably tachometer, speed sensor or the wheel/axle mounted accelerometer array.

A radar is checked, at predefined discrete locations, against a pair of two landmarks with known separation distance between these landmarks. Each vehicle consists of a minimum set of two radars one at the front end and the other at the rear end.

The train length is known to the system and therefore the same landmark is observed by both front and rear radars but with temporal and spatial diversity. Temporal diversity is accomplished when the rear radar observes the same object observed by the front radar but with a lag of L/V where L is the train length and V is the train speed.

Spatial diversity is accomplished when the rear radar observes the same object observed by the front radar but from the opposite direction (view point). These two view points are 180 degrees opposite to each other (i.e. the front has an "approaching" view, then "no view" which is the temporal diversity and then the rear radar has a "departing/receding" view.

The vehicle odometry and motion direction system and method, in accordance with an embodiment, determines the length of the train based on the pair of landmark observed by the front radar and then by rear radar with temporal and spatial diversity.

The vehicle odometry and motion direction system and method, in accordance with an embodiment, detects an "anomaly" in the radar speed due to external environmental influences as the "anomaly" will be observed (a) by the front and rear radar but with a lag (L/V) due to the temporal diversity (b) The external influence due to the "anomaly" on the rear and front radar will be 180 degrees out of phase (spatial diversity. i.e., if the "anomaly" cause the front radar to report a speed with V+$\Delta$V then the same "anomaly" will cause the rear radar to report a speed with V−$\Delta$V. V is the nominal speed and $\Delta$V is the change in speed due to the "anomaly".

When approaching a landmark the range and velocity measurements from the radar are crossed compared with the IMU dead reckoning calculations of speed ($\Sigma$ a$\Delta$t) and distance travelled ($\Sigma$(V$\Delta$t+½a$\Delta$t2)). If out of bound an alarm regarding the integrity of the radar measurements and/or the IMU measurements is raised.

When approaching a landmark, the acceleration calculated based on the radar speed ($\Delta$V/$\Delta$t) will be compared with the IMU measured acceleration. If out of bound an alarm regarding the integrity of the radar measurements and/or the IMU measurements is raised.

FIG. 16 is a block diagram of a vehicle odometry and motion direction computer system 1600 in accordance with some embodiments.

In some embodiments, vehicle odometry and motion direction computer system 1600 is a general purpose computing device including a hardware processor 1602 and a non-transitory, computer-readable storage medium 1604. Storage medium 1604, amongst other things, is encoded with, i.e., stores, computer program code 1606, i.e., a set of executable instructions. Execution of instructions 1606 by hardware processor 1602 represents (at least in part) a vehicle odometry and motion direction computer tool which implements a portion or all of the methods described herein in accordance with one or more embodiments (hereinafter, the noted processes and/or methods).

Processor 1602 is electrically coupled to computer-readable storage medium 1604 via a bus 1608. Processor 1602 is also electrically coupled to an I/O interface 1610 by bus 1608. A network interface 1612 is also electrically connected to processor 1602 via bus 1608. Network interface 1612 is connected to a network 1614, so that processor 1602 and computer-readable storage medium 1604 are capable of connecting to external elements via network 1614. Processor 1602 is configured to execute computer program code 1606 encoded in computer-readable storage medium 1604 in order to cause system 1600 to be usable for performing a portion or all of the noted processes and/or methods. In one or more embodiments, processor 1602 is a central processing unit (CPU), a multi-processor, a distributed processing system, an application specific integrated circuit (ASIC), and/or a suitable processing unit.

In one or more embodiments, computer-readable storage medium 1604 is an electronic, magnetic, optical, electromagnetic, infrared, and/or a semiconductor system (or apparatus or device). For example, computer-readable storage medium 1604 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 1604 includes a compact disk-read only memory (CD-ROM), a compact disk-read/write (CD-R/W), and/or a digital video disc (DVD).

In one or more embodiments, storage medium 1604 stores computer program code 1606 configured to cause system 1600 to be usable for performing a portion or all of the noted processes and/or methods. In one or more embodiments, storage medium 1604 also stores information which facilitates performing a portion or all of the noted processes and/or methods. In one or more embodiments, storage medium 1604 stores parameters 1607.

vehicle odometry and motion direction computer system 1600 includes I/O interface 1610. I/O interface 1610 is coupled to external circuitry. In one or more embodiments, I/O interface 1610 includes a keyboard, keypad, mouse, trackball, trackpad, touchscreen, and/or cursor direction keys for communicating information and commands to processor 1602.

vehicle odometry and motion direction computer system 1600 also includes network interface 1612 coupled to processor 1602. Network interface 1612 allows system 1600 to communicate with network 1614, to which one or more other computer systems are connected. Network interface 1612 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more systems 1600.

System 1600 is configured to receive information through I/O interface 1610. The information received through I/O interface 1610 includes one or more of instructions, data, design rules, libraries of standard cells, and/or other parameters for processing by processor 1602. The information is transferred to processor 1602 via bus 1608. vehicle odometry and motion direction computer system 1600 is configured to receive information related to a UI through I/O interface 1610. The information is stored in computer-readable medium 1604 as user interface (UI) 1642.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of vehicle odometry and/or motion detection, comprising:
   determining a vehicle motion direction based on radar Doppler speed data relative to one or more targets;
   converting the radar Doppler speed data to first ground speed data;
   determining the first ground speed data is acceptable based on speed histogram distributions and a spatial distribution of the one or more targets;
   calculating second ground speed data for at least two stationary retroreflectors within a radar's field of view, wherein the separation distance between the two retroreflectors is known;
   determining trusted ground speed data using the first ground speed data, the second ground speed data, range data including the range to the at least two retroreflectors and calculated range rate to the at least two retroreflectors; and
   adjusting the trusted ground speed data due to errors in the radar Doppler speed data; and
   checking the trusted ground speed data against diverse sensor data from a diverse sensor, wherein the diverse sensor failure modes are non-overlapping to radar failure modes.

2. The method of claim 1, wherein the vehicle motion direction is determined from the first ground speed data and the second ground speed data from a first radar mounted at one end of the vehicle.

3. The method of claim 2, wherein the vehicle motion direction is determined from the first ground speed data and the second ground speed data from a second radar mounted at another end of the vehicle.

4. The method of claim 1, wherein the spatial distribution of the one or more targets is within a region-of-interest.

5. The method of claim 1, wherein the diverse sensor is a body mounted IMU with 3-D accelerometer, 3-D gyroscope, a wheel/axle mounted accelerometer array, an optical tachometer, a Hall effect speed sensor, a LiDAR or a Visible/IR spectrum camera.

6. The method of claim 1, wherein the diverse sensor provides vehicle motion direction, ground speed or dead reckoning distance travelled.

7. The method of claim 1, further comprising a second diverse sensor having second diverse sensor failure modes and where the second diverse sensor failure modes are non-overlapping the diverse sensor failure modes and the radar failure modes.

8. A system for vehicle odometry and/or motion detection comprises:
   a radar mounted at one end of a vehicle, wherein the radar has radar failure modes;
   a diverse sensor mounted on the vehicle, wherein the diverse sensor has diverse sensor failure modes and the diverse sensor failure modes are non-overlapping to the radar failure modes;
   a computer connected to the radar and the diverse sensor; wherein the radar is configured to collect Doppler speed data, range data and radar-cross-section data based on one or more targets, the computer is configured to convert the radar Doppler speed data into first ground speed data and first motion direction data;
   the computer is configured to determine if the first ground speed data and the first motion direction data is acceptable based on a speed histogram distribution and a spatial distribution of the one or more targets, the computer is configured to calculate second ground speed data and second motion direction data for at least two stationary retroreflectors within the radar's field of view, wherein the separation distance between the at least two retroreflectors is known; the computer is configured to determine trusted ground speed data using the first ground speed data, the second ground speed data, range data including the range to the at least two retroreflectors and calculated range rate to the at least two retroreflectors, the computer is configured to adjust the trusted ground speed data due to errors in the radar Doppler speed data; and the computer is configured to check the trusted ground speed data against diverse sensor data from a diverse sensor, wherein the diverse sensor has non-overlapping failure modes to the radar failure modes.

9. The system of claim 8, further comprising a second radar mounted at another end of the vehicle that collects Doppler speed, range and radar-cross-section data to determine a second set of the first ground speed and the second ground speed.

10. The system of claim 8, wherein the computer uses measured distances to the two reflective landmarks to determine length of the vehicle.

11. The system of claim 10, wherein the computer uses Doppler speed data from the radar and Doppler speed data from the second radar based on the distances to the two reflective landmarks to determine the trusted ground speed data.

12. The system of claim 8, wherein the computer groups the one or more targets to determine second ground speed data.

13. The system of claim 8, wherein the spatial distribution of the one or more targets is within a region-of-interest.

14. The system of claim 8, wherein the diverse sensor is a body mounted IMU with 3-D accelerometer, 3-D gyroscope, a wheel/axle mounted accelerometer array, an optical tachometer, a Hall effect speed sensor, a LiDAR or a Visible/IR spectrum camera.

15. The system of claim 8, wherein the diverse sensor provides vehicle motion direction, ground speed or dead reckoning distance travelled.

16. The system of claim 8, further comprising a second diverse sensor having second diverse sensor failure modes and where the second diverse sensor failure modes are non-overlapping the diverse sensor failure modes and the radar failure modes.

17. A method of vehicle odometry and/or motion detection, comprising:
   determining, using a radar, first ground speed data based on one or more targets, wherein the radar has radar failure modes;
   calculating second ground speed data for at least two stationary retroreflectors within a radar field of view, wherein the separation distance between the two retroreflectors is known;
   determining trusted ground speed data using the first ground speed data, the second ground speed data, range data including the range to the at least two retroreflectors and calculated range rate to the at least two retroreflectors; and
   checking the trusted ground speed data against diverse sensor data from a diverse sensor, wherein the diverse sensor has diverse sensor failure modes and the diverse sensor failure modes are non-overlapping to the radar failure modes.

18. The method of claim 17, wherein the diverse sensor is a body mounted IMU with 3-D accelerometer, 3-D gyroscope, a wheel/axle mounted accelerometer array, an optical tachometer, a Hall effect speed sensor, a LiDAR or a Visible/IR spectrum camera.

19. The method of claim 17, wherein the diverse sensor data includes vehicle motion direction, ground speed or dead reckoning distance travelled.

20. The method of claim 17, further comprising a second diverse sensor having second diverse sensor failure modes and where the second diverse sensor failure modes are non-overlapping the diverse sensor failure modes and the radar failure modes.

* * * * *